(12) United States Patent
Shibata et al.

(10) Patent No.: US 12,461,401 B2
(45) Date of Patent: *Nov. 4, 2025

(54) OPTICAL DEVICE AND OPTICAL SYSTEM

(71) Applicant: TDK CORPORATION, Tokyo (JP)

(72) Inventors: Tetsuya Shibata, Tokyo (JP); Hideaki Fukuzawa, Tokyo (JP); Takashi Kikukawa, Tokyo (JP); Tomohito Mizuno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 676 days.

This patent is subject to a terminal disclaimer.

(21) Appl. No.: 17/694,917

(22) Filed: Mar. 15, 2022

(65) Prior Publication Data

US 2022/0317484 A1    Oct. 6, 2022

(30) Foreign Application Priority Data

Mar. 30, 2021 (JP) ................... 2021-056795
Dec. 20, 2021 (JP) ................... 2021-206036

(51) Int. Cl.
*G02F 1/05* (2006.01)
*H01S 5/00* (2006.01)

(52) U.S. Cl.
CPC .......... *G02F 1/0508* (2013.01); *G02F 1/0516* (2013.01); *H01S 5/0085* (2013.01)

(58) Field of Classification Search
CPC ...... G02B 6/4296; G02B 6/4274; G02B 6/43; G02F 1/0508; G02F 1/0516; H01S 5/0085
USPC ............................................................. 385/2
See application file for complete search history.

(56) References Cited

U.S. PATENT DOCUMENTS

| 4,340,272 | A | 7/1982 | Papuchon et al. |
| 10,082,628 | B2 | 9/2018 | Sugiyama |
| 11,953,742 | B2* | 4/2024 | Shibata .................... G02B 6/43 |
| 2003/0035606 | A1 | 2/2003 | Hajjar et al. |
| 2003/0169981 | A1 | 9/2003 | Naknishi et al. |
| 2004/0047021 | A1* | 3/2004 | Sakane ................ G02B 6/4208 359/237 |
| 2010/0116801 | A1* | 5/2010 | Mukai ................... B08B 7/0042 219/121.85 |
| 2023/0368840 | A1* | 11/2023 | Mizukami ........... G11C 11/1675 |

FOREIGN PATENT DOCUMENTS

| JP | S55134818 A | 10/1980 |
| JP | H0878703 A | 3/1996 |

(Continued)

OTHER PUBLICATIONS

Jun-Yang Chen et al. "All-Optical Switching of Magnetic Tunnel Junctions With Single Subpicosecond Laser Pulses". Physical Review Applied, 2017, vol. 7, pp. 021001-1-021001-6.

(Continued)

*Primary Examiner* — Jerry M Blevins
(74) *Attorney, Agent, or Firm* — Oliff PLC

(57) ABSTRACT

An optical device that includes at least one magnetic element including a first ferromagnetic layer, a second ferromagnetic layer, and a spacer layer sandwiched between the first ferromagnetic layer and the second ferromagnetic layer; a substrate; and a waveguide is provided, wherein the waveguide and the magnetic element are located on or above the substrate, and wherein at least some of light propagating in the waveguide is applied to the magnetic element.

10 Claims, 26 Drawing Sheets

(56) References Cited

FOREIGN PATENT DOCUMENTS

| JP | 2017-223738 A | 12/2017 |
|----|---------------|---------|
| JP | 2018-180513 A | 11/2018 |

OTHER PUBLICATIONS

Jun-Yang Chen et al., All-Optical Switching of Magnetic Tunnel Junctions with Single Subpicosecond Laser Pulses, Physical Review Applied 7, 021001 (2017).
Mar. 22, 2023 Office Action issued In U.S. Appl. No. 17/693,558.
English Translation of May 30, 2023 Office Action issued in Chinese Patent Application No. 202210309901.3.
Oct. 11, 2023 Office Action issued in U.S. Appl. No. 17/693,558.
English Translation of Aug. 25, 2023 Office Action issued in Chinese Patent Application No. 202210309901.3.
Jan. 24, 2024 Notice of Allowance issued in U.S. Appl. No. 17/693,558.

\* cited by examiner

OPTICAL DEVICE AND OPTICAL SYSTEM

BACKGROUND

The present disclosure relates to an optical device and an optical system.

Priority is claimed on Japanese Patent Application No. 2021-056795, filed on Mar. 30, 2021, and Japanese Patent Application No. 2021-206036, filed on Dec. 20, 2021, the contents of which are incorporated herein by reference.

In recent years, attention has been focused on an optical device using a waveguide. For example, a planar lightwave circuit (PLC) is an example of an optical device and is used in augmented reality (AR) glasses or a small projector. Further, for example, an optical modulator is an example of an optical device and is used for optical communication.

For example, Patent Document 1 describes a wavelength division multiplex circuit which is an example of an optical device. The wavelength division multiplex circuit described in Patent Document 1 uses a semiconductor photodiode (PD) as a wavelength monitor of a variable wavelength light source.

PATENT DOCUMENTS

[Patent Document 1] Japanese Unexamined Patent Application, First Publication No. 2017-223738

SUMMARY

In the semiconductor photodiode manufactured as a separate member, it is necessary to adjust an optical axis with respect to the waveguide of the optical device. Further, the semiconductor photodiode manufactured as a separate member has a large size. New breakthroughs are required for the further development of an optical device.

It is desirable to provide a novel optical device.

The following means are provided.

An optical device according to a first aspect includes at least one magnetic element including a first ferromagnetic layer, a second ferromagnetic layer, and a spacer layer sandwiched between the first ferromagnetic layer and the second ferromagnetic layer; a substrate; and a waveguide, wherein the waveguide and the magnetic element are located on or above the substrate, and wherein at least some of light propagating in the waveguide is applied to the magnetic element.

An optical system according to a second aspect includes the optical device according to the aspect; and optics system that guides light output from the optical device to an object to be irradiated.

DETAILED DESCRIPTION

Figure 1:
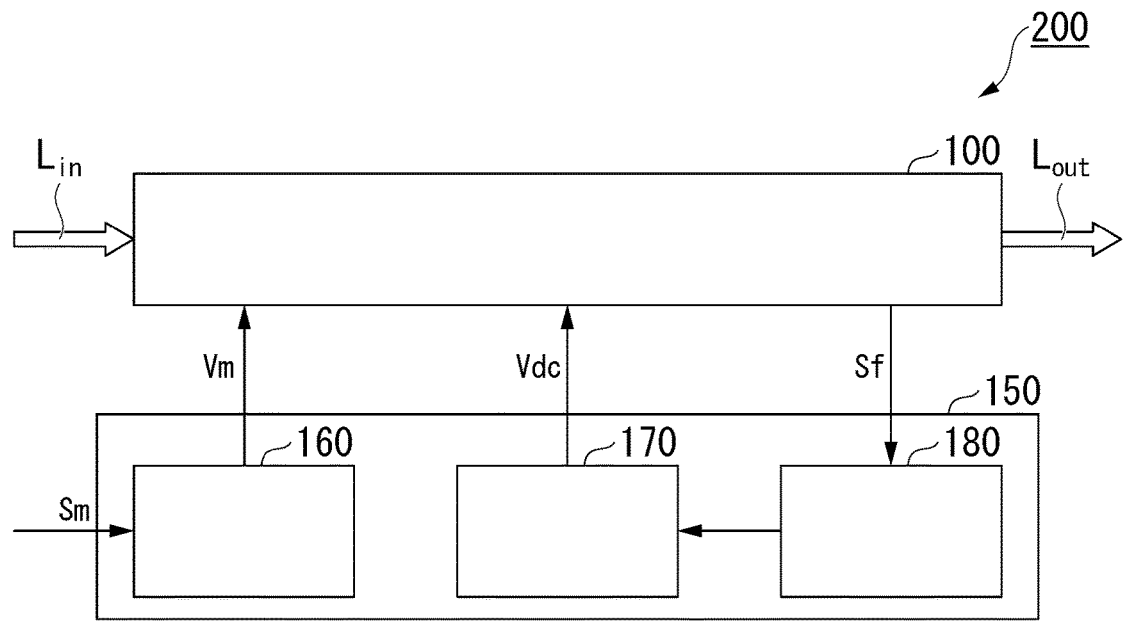
FIG. 1 is a block diagram of an optical device according to a first embodiment.

Hereinafter, embodiments will be described in detail with reference to the drawings as appropriate. In the drawings used in the following description, there are cases in which characteristic portions are appropriately enlarged for convenience of illustration so that characteristics of the present embodiment can be easily understood, and dimensional proportions of respective constituent elements may be different from actual ones. Materials, dimensions, and the like illustrated in the following description are merely examples, and the present disclosure is not limited thereto and can be implemented with appropriate modifications within a range in which the effects of the present disclosure are achieved.

Directions will be defined. One direction in a plane on which a substrate 10 (see FIG. 3) extends is referred to as an x direction, and a direction in the plane perpendicular to the x direction is referred to as a y direction. A direction perpendicular to the substrate 10 (direction perpendicular to the x direction and the y direction) is referred to as a z direction. Hereinafter, a +z direction may be expressed as "upward" and a −z direction may be expressed as "downward." The "upward" and the "downward" may not necessarily have to coincide with a direction in which gravity is applied.

First Embodiment

FIG. 1 is a block diagram of an optical device 200 according to a first embodiment. The optical device 200 includes an optical modulation element 100 and a control part 150. The control part 150 includes, for example, a drive circuit 160, a DC bias application circuit 170, and a control circuit 180. The optical device 200 is, for example, an optical modulator.

The optical modulation element 100 shown in FIG. 1 converts an electric signal into an optical signal. The optical modulation element 100 converts input light $L_{in}$ into output light $L_{out}$ according to a modulation signal Sm. The light in the present specification is not limited to visible light and may also be infrared light having a wavelength longer than that of visible light or ultraviolet light having a wavelength shorter than that of visible light. The wavelength of visible light is, for example, 380 nm or more and less than 800 nm. The wavelength of infrared light is, for example, 800 nm or more and 1 mm or less. The wavelength of ultraviolet light is, for example, 200 nm or more and less than 380 nm.

The drive circuit 160 applies a modulation voltage Vm corresponding to the modulation signal Sm to electrodes (an electrode 41 and an electrode 42 which will be described later) of the optical modulation element 100. The DC bias application circuit 170 applies a DC bias voltage Vdc to electrodes (an electrode 43 and an electrode 44 which will be described later) of the optical modulation element 100. The control circuit 180 receives an electric signal Sf from a magnetic element 30 of the optical modulation element 100 and sends a signal based on the electric signal Sf to the DC bias application circuit 170.

Figure 2:
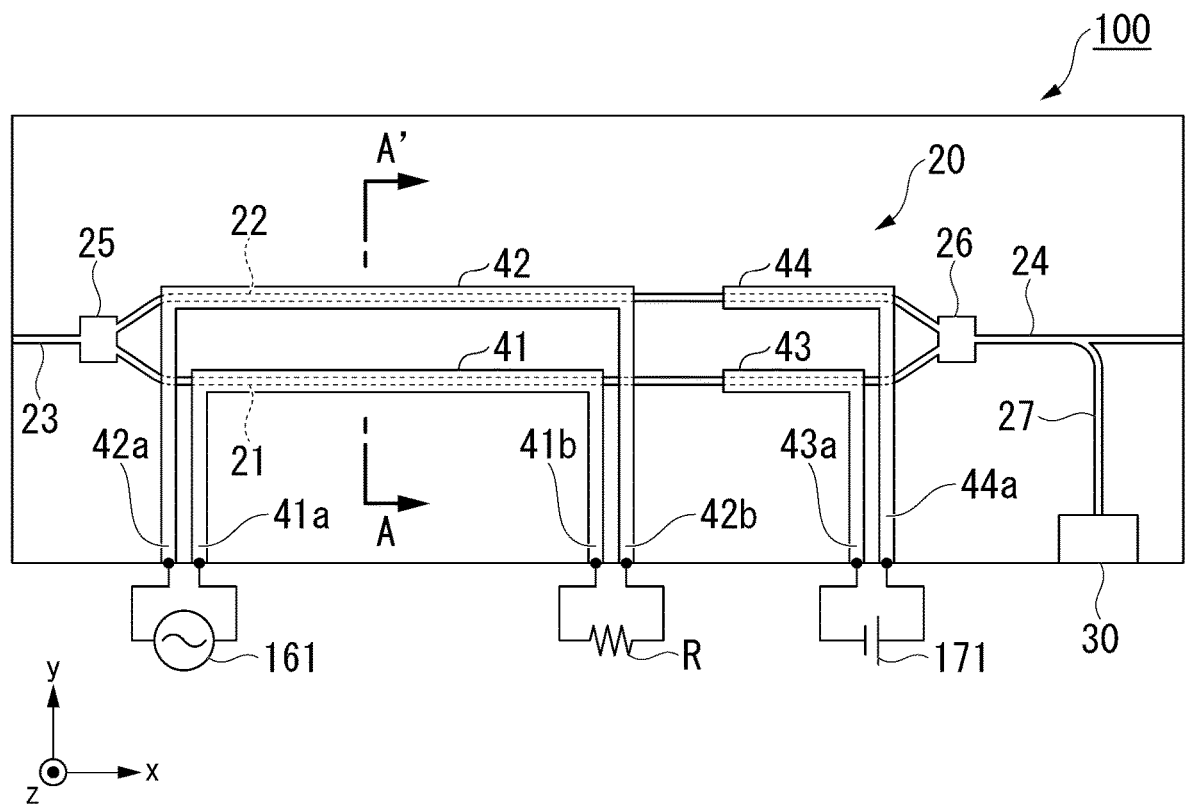
FIG. 2 is a plan view of an optical modulation element according to the first embodiment.
Figure 3:
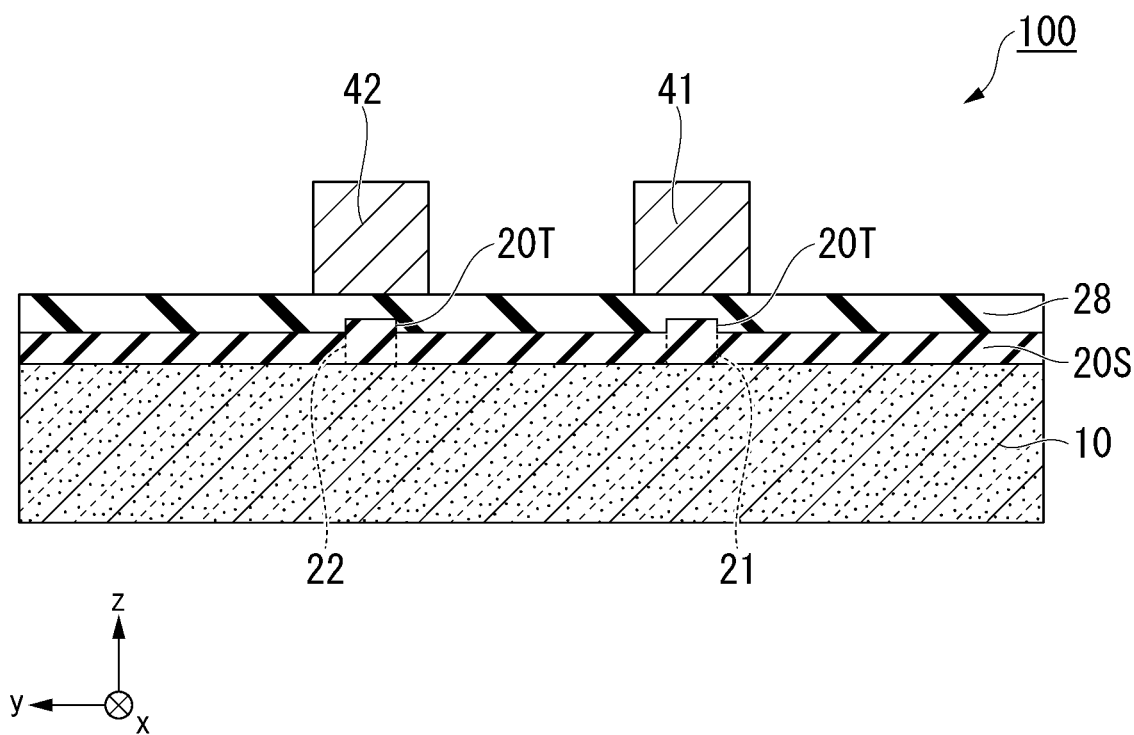
FIG. 3 is a cross-sectional view of the optical modulation element according to the first embodiment.

FIG. 2 is a plan view of an optical modulation element 100 according to the first embodiment. FIG. 3 is a cross-sectional view of the optical modulation element 100 according to the first embodiment and is a cross section along A-A' in FIG. 2. FIG. 2 shows power supplies 161 and 171 and a terminating resistor R together.

The optical modulation element 100 includes a substrate 10, a waveguide 20, a magnetic element 30, and electrodes 41, 42, 43, and 44.

A first end 41a of the electrode 41 and a first end 42a of the electrode 42 are connected to, for example, the power supply 161. A second end 41b of the electrode 41 and a second end 42b of the electrode 42 are connected to, for example, the terminating resistor R. The power supply 161 is a part of the drive circuit 160.

A first end 43a of the electrode 43 and a first end 44a of the electrode 44 are connected to, for example, the power supply 171. The power supply 171 is a part of the DC bias application circuit 170.

The substrate 10 contains, for example, aluminum oxide. The substrate 10 is, for example, sapphire. The substrate 10 may be a substrate of a semiconductor such as silicon.

The waveguide 20 is formed on the substrate 10. The waveguide 20 has, for example, a first waveguide 21, a second waveguide 22, an input waveguide 23, an output waveguide 24, a branch portion 25, a coupling portion 26, and a monitoring waveguide 27.

The input waveguide 23 has an input terminal to which the input light $L_{in}$ is input and is connected to the branch portion 25. The branch portion 25 is located between the input waveguide 23 and the first and second waveguides 21 and 22.

The first waveguide 21 and the second waveguide 22 extend in the x direction, for example. The lengths of the first waveguide 21 and the second waveguide 22 in the x direction are, for example, substantially the same.

The coupling portion 26 is located between the first and second waveguides 21 and 22 and the output waveguide 24. The output waveguide 24 is connected to the coupling portion 26 and has an output terminal from which the output light $L_{out}$ is output.

The monitoring waveguide 27 is connected to, for example, the output waveguide 24. At least some of the light propagating in the output waveguide 24 propagates in the monitoring waveguide 27. Hereinafter, at least some of the light propagating in the waveguide 20 may be referred to as monitoring light. The monitoring waveguide 27 may be connected to a portion other than the output waveguide 24 of the waveguide 20 according to a portion where the state of light is desired to be monitored.

As shown in FIG. 3, the first waveguide 21 and the second waveguide 22 are constituted by a part of the slab 20S and a ridge-shaped portion 20T. The slab 20S extends on the substrate 10. The ridge-shaped portion 20T protrudes from an upper surface of the slab 20S. The slab 20S increases an intensity of an electric field applied to the waveguide 20.

The slab 20S and the ridge-shaped portion 20T contain lithium niobate as a main component. Therefore, the waveguide 20 contains lithium niobate as a main component. Some elements of the lithium niobate may be replaced with other elements. The waveguide 20 is covered with, for example, a clad 28. The clad 28 is, for example, $SiO_2$, $Al_2O_3$, $MgF_2$, $La_2O_3$, $ZnO$, $HfO_2$, $MgO$, $Y_2O_3$, $CaF_2$, $In_2O_3$, or the like or a mixture thereof. The material of the slab 20S and the ridge-shaped portion 20T and the material of the clad 28 are not limited to this example. For example, the slab 20S and the ridge-shaped portion 20T may be silicon or silicon oxide to which germanium oxide is added, and the clad 28 may be silicon oxide. The input waveguide 23, the output waveguide 24, the branch portion 25, the coupling portion 26, and the monitoring waveguide 27 also have the same configuration as the first waveguide 21 and the second waveguide 22.

The magnetic element 30 is located at a position where the monitoring light is applied. The magnetic element 30 is located, for example, at the end of the output terminal of the monitoring waveguide 27 (in an extending direction of the monitoring waveguide 27). The magnetic element 30 is an example of a first magnetic element.

Figure 4:
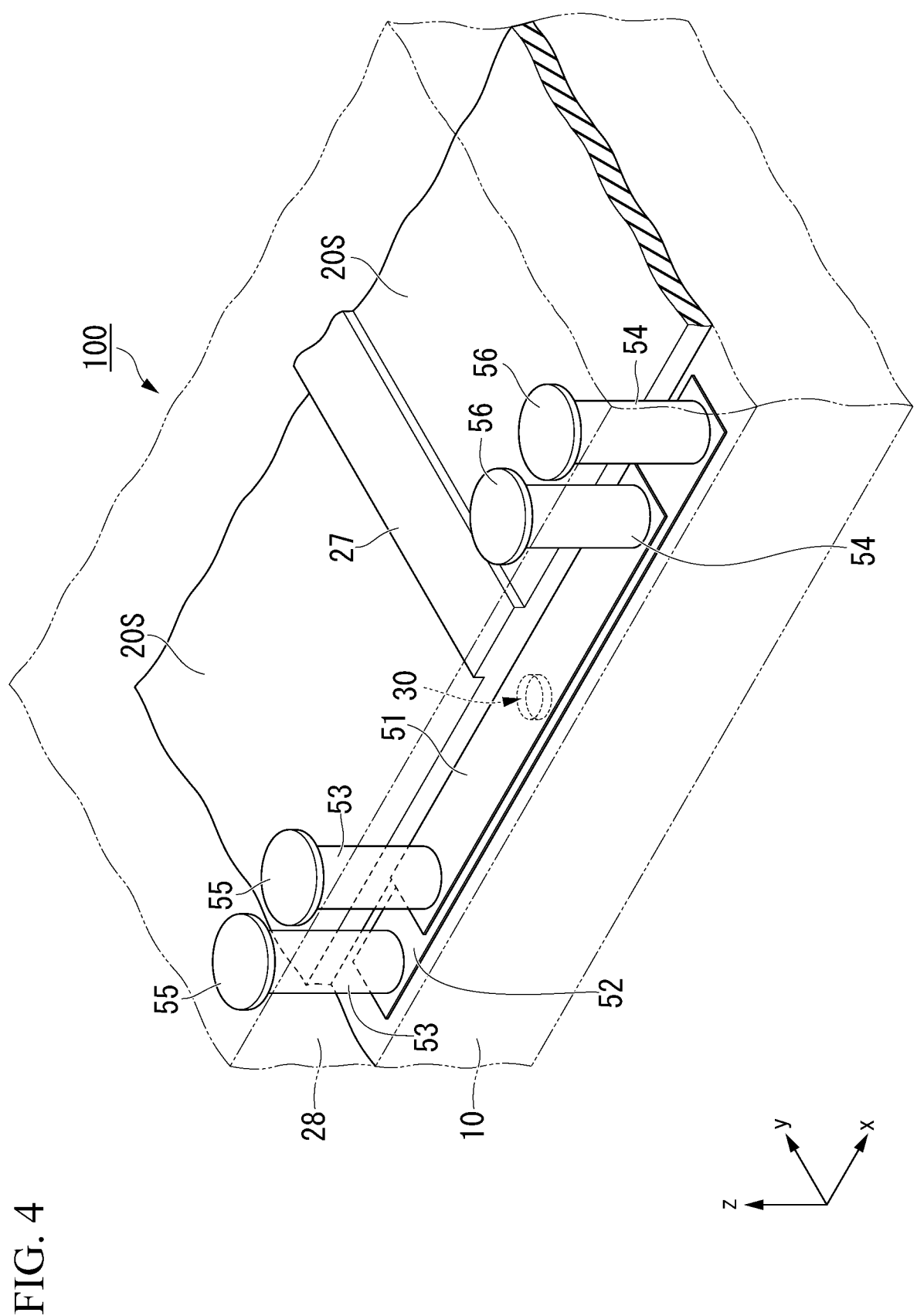
FIG. 4 is a perspective view of the vicinity of a magnetic element of the optical modulation element according to the first embodiment.
Figure 5:
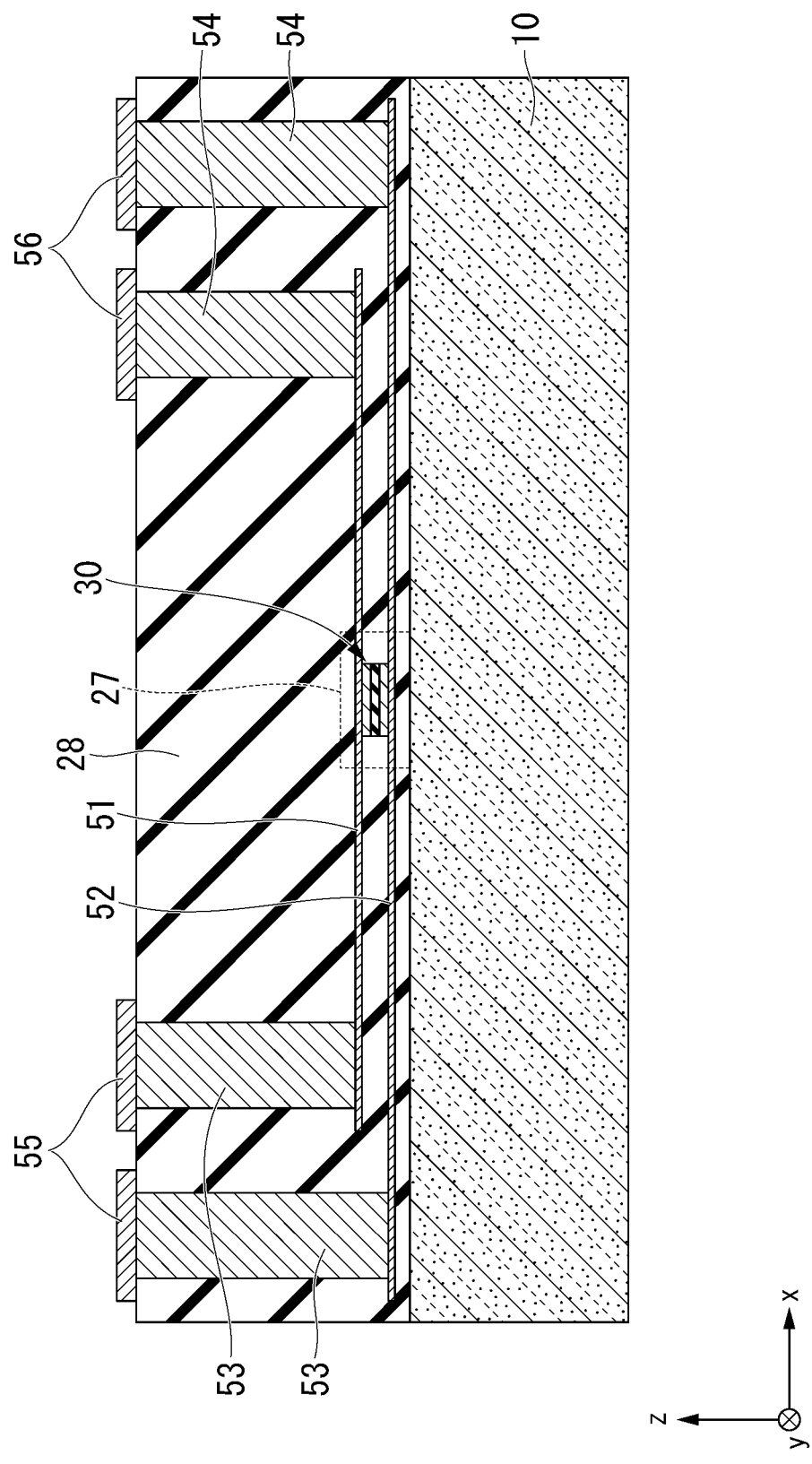
FIG. 5 is a cross-sectional view of the vicinity of the magnetic element of the optical modulation element according to the first embodiment.

FIG. 4 is a perspective view of the vicinity of a magnetic element 30 of the optical modulation element 100 according to the first embodiment. FIG. 5 is a cross-sectional view of the vicinity of the magnetic element 30 of the optical modulation element 100 according to the first embodiment.

At least some (monitoring light) of the light propagating in the waveguide 20 is applied to the magnetic element 30 from a direction intersecting a lamination direction of the magnetic element 30, for example. The monitoring light is applied to, for example, a side surface of the magnetic element 30. The magnetic element 30 is formed on the substrate 10, which is the same substrate 10 on which the waveguide 20 is formed. That is, the magnetic element 30 and the waveguide 20 are incorporated in one article. The waveguide 20 and the magnetic element 30 are located on the substrate 10 or above the substrate 10.

The magnetic element 30 is electrically connected to, for example, electrodes 51 and 52, via wirings 53 and 54, an input terminal 55, and an output terminal 56.

The electrode 51 is connected to a first surface of the magnetic element 30. The electrode 52 is connected to a second surface of the magnetic element 30. The first surface and the second surface face each other in the lamination direction of the magnetic element 30.

The electrodes 51 and 52 contain a conductive material. The electrodes 51 and 52 are made of, for example, a metal such as Cu, Al, Au, or Ru. Ta or Ti may be stacked above and below the metal. Further, a stacked film of Cu and Ta, a stacked film of Ta, Cu, and Ti, and a stacked film of Ta, Cu, and TaN may be used as the electrodes 51 and 52. Further, TiN or TaN may be used as the electrodes 51 and 52.

The electrodes 51 and 52 may have transparency in a wavelength range of the light applied to the magnetic element 30. For example, the electrodes 51 and 52 may be transparent electrodes that contain a transparent electrode material of an oxide such as indium tin oxide (ITO), indium zinc oxide (IZO), zinc oxide (ZnO), or indium gallium zinc oxide (IGZO). Also, the electrodes 51 and 52 may be configured to have a plurality of columnar metals in the transparent electrode material.

The via wiring 53 connects the input terminal 55 to the electrode 51 or the electrode 52. There are, for example, two input terminals 55. A current or a voltage is input to one of the input terminals 55, and the other of the input terminals 55 is connected to a reference electric potential. The input terminal 55 is exposed, for example, on an upper surface of the clad 28. The via wiring 54 connects the output terminal 56 to the electrode 51 or the electrode 52. There are, for example, two output terminals 56. A signal is output from one of the output terminals 56, and the other of the output terminals 56 is connected to the reference electric potential. The output terminal 56 is exposed, for example, on the upper surface of the clad 28. The via wirings 53 and 54, the input terminals 55, and the output terminals 46 contain a material having conductivity. As materials of the via wirings 53 and 54, the input terminals 55, and the output terminals 56, the same materials as those taken as examples of the electrodes 51 and 52 can be used.

Figure 6:
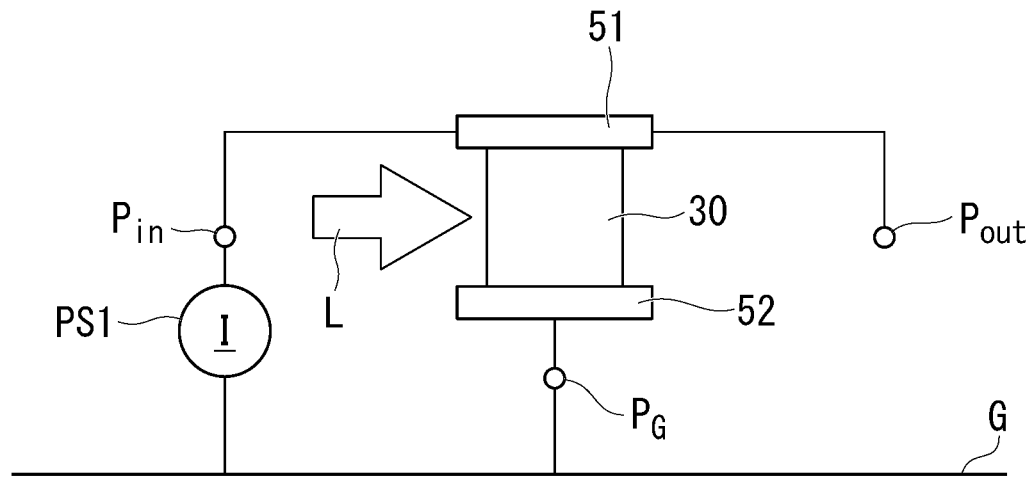
FIG. 6 is an example of a monitoring circuit of the optical modulation element according to the first embodiment.
Figure 7:
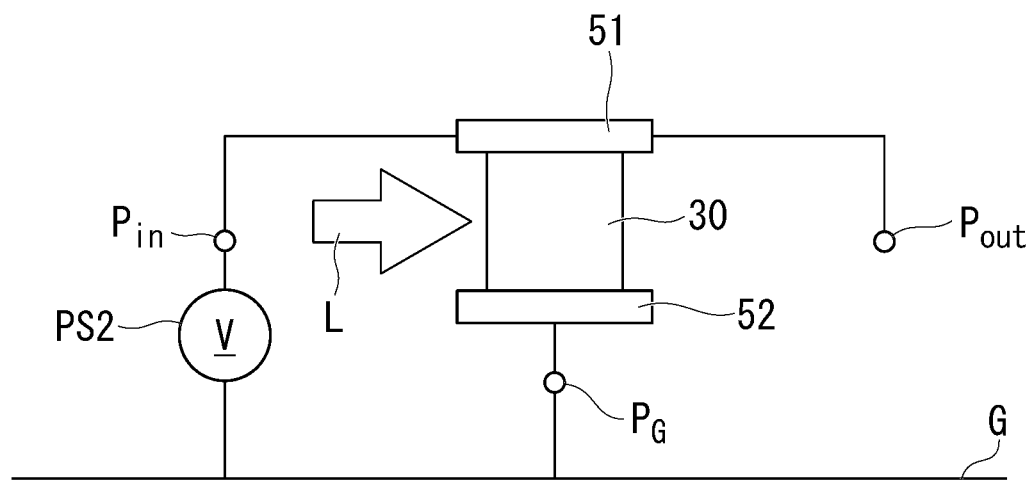
FIG. 7 is another example of the monitoring circuit of the optical modulation element according to the first embodiment.

FIGS. 6 and 7 are examples of a light monitoring circuit using the magnetic element 30 of the optical modulation element 100 according to the first embodiment. In FIGS. 6 and 7, the electrode 51 is connected to, for example, an input terminal $P_{in}$ and an output terminal $P_{out}$. In FIGS. 6 and 7, the electrode 52 is connected to, for example, a reference electric potential terminal $P_G$. The input terminal $P_{in}$ corresponds to one of the input terminals 55 in FIGS. 4 and 5. The output terminal $P_{out}$ corresponds to one of the output terminals 56 in FIGS. 4 and 5. The reference electric potential terminal $P_G$ corresponds to the other of the input terminal 55 and the other of the output terminal 56 in FIGS. 4 and 5. The reference electric potential in FIGS. 6 and 7 is ground G. The ground G may be provided outside the optical modulation element 100. The reference electric potential may be other than the ground G.

The magnetic element 30 converts a change in a state of applied light (monitoring light L) into an electric signal. An output voltage or an output current from the magnetic element 30 changes in accordance with an intensity of the applied light (the monitoring light L).

The input terminal $P_{in}$ is connected to a current source PS1 or a voltage source PS2. The current source PS1 and the voltage source PS2 are located outside the optical modulation element 100, for example. When the input terminal Pi is connected to the current source PS1, the output terminal $P_{out}$ outputs a resistance value of the magnetic element 30 in the lamination direction as a voltage. When the input terminal $P_{in}$ is connected to the voltage source PS2, the output terminal $P_{out}$ outputs a resistance value of the magnetic element 30 in the lamination direction as a current. When it is not necessary to apply a current or voltage to the magnetic element 30 from the outside, the input terminal $P_{in}$ and the current source PS1 or the voltage source PS2 may be omitted.

Figure 8:
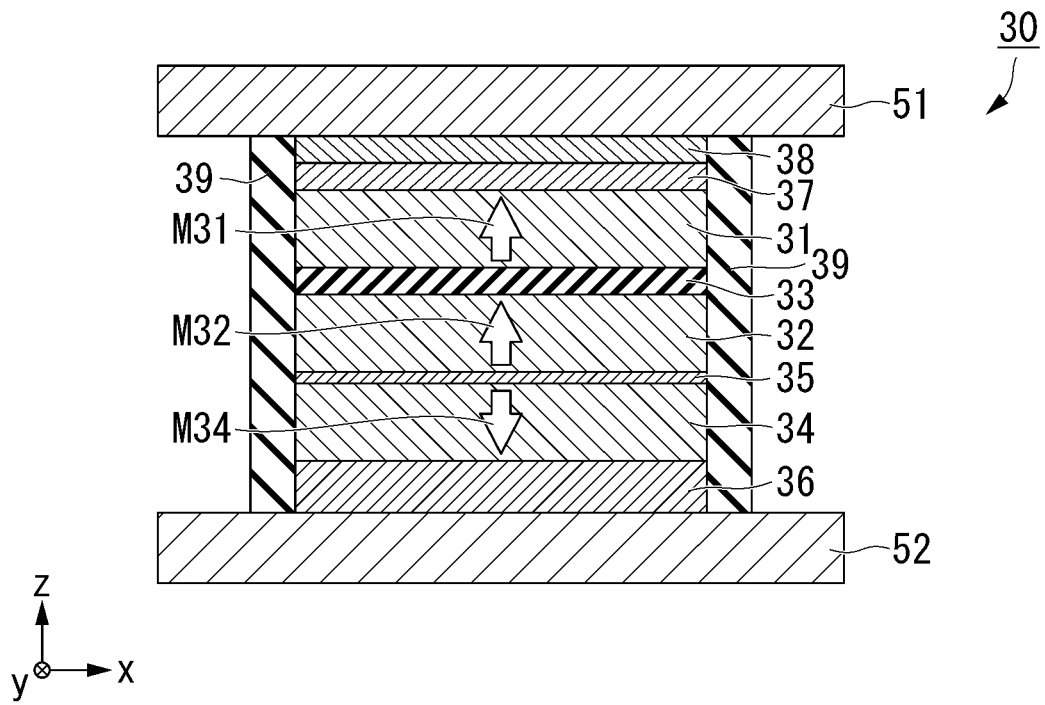
FIG. 8 is a cross-sectional view of the magnetic element according to the first embodiment.

FIG. 8 is a cross-sectional view of the magnetic element 30 according to the first embodiment. In FIG. 8, the electrodes 51 and 52 are shown at the same time, and a magnetization direction in an initial state of a ferromagnetic substance is indicated by an arrow.

The magnetic element 30 includes at least a first ferromagnetic layer 31, a second ferromagnetic layer 32, and a spacer layer 33. The spacer layer 33 is positioned between the first ferromagnetic layer 31 and the second ferromagnetic layer 32. In addition to these, the magnetic element 30 may include a third ferromagnetic layer 34, a magnetic coupling layer 35, an underlayer 36, a perpendicular magnetization inducing layer 37, a cap layer 38, a side wall insulating layer 39, or the like. The magnetic element 30 has a maximum width of, for example, 2000 nm or less in a plan view from the lamination direction. The magnetic element 30 has the maximum width of, for example, 10 nm or more in a plan view from the lamination direction.

The magnetic element 30 is, for example, a magnetic tunnel junction (MTJ) element in which the spacer layer 33 is formed of an insulating material. In this case, in the magnetic element 30, a resistance value thereof in the lamination direction (a resistance value when a current is caused to flow in the lamination direction) changes according to a relative change between a state of a magnetization M31 of the first ferromagnetic layer 31 and a state of a magnetization M32 of the second ferromagnetic layer 32. Such an element is also called a magnetoresistance effect element.

The first ferromagnetic layer 31 is a photodetection layer whose magnetization state changes when light is applied from the outside. The first ferromagnetic layer 31 is also called a magnetization free layer. The magnetization free layer is a layer containing a magnetic material whose magnetization state changes when a predetermined external energy is applied. The predetermined external energy may be, for example, light applied from the outside (the monitoring light L), a current flowing in the lamination direction of the magnetic element 30, and an external magnetic field. A state of the magnetization M31 of the first ferromagnetic layer 31 changes in accordance with an intensity of the light (the monitoring light L) applied to the first ferromagnetic layer 31.

The first ferromagnetic layer 31 contains a ferromagnetic material. The first ferromagnetic layer 31 contains at least one of magnetic elements such as, for example, Co, Fe, or Ni. The first ferromagnetic layer 31 may contain a non-magnetic element such as B, Mg, Hf, or Gd in addition to the magnetic elements as described above. The first ferromagnetic layer 31 may be an alloy containing, for example, a magnetic element and a non-magnetic element. The first ferromagnetic layer 31 may be formed of a plurality of layers. The first ferromagnetic layer 31 may be, for example, a CoFeB alloy, a laminate in which a CoFeB alloy layer is sandwiched between Fe layers, or a laminate in which a CoFeB alloy layer is sandwiched between CoFe layers.

The first ferromagnetic layer 31 may be an in-plane magnetization film having an axis of easy magnetization in a film in-plane direction, or a perpendicular magnetization film having an axis of easy magnetization in a direction perpendicular to the film surface (the lamination direction of the magnetic elements 30).

A film thickness of the first ferromagnetic layer 31 may be, for example, 1 nm or more and 5 nm or less. The film thickness of the first ferromagnetic layer 31 may be, for example, 1 nm or more and 2 nm or less. In a case in which the first ferromagnetic layer 31 is a perpendicular magnetization film, when a film thickness of the first ferromagnetic layer 31 is small, an effect of applying perpendicular magnetic anisotropy from upper and lower layers of the first ferromagnetic layer 31 is strengthened, and the perpendicular magnetic anisotropy of the first ferromagnetic layer 31 is enhanced. That is, when the perpendicular magnetic anisotropy of the first ferromagnetic layer 31 is high, a force that the magnetization M31 tries to return in a direction perpendicular to the film surface (to the original state) is strengthened. On the other hand, when the film thickness of the first ferromagnetic layer 31 is large, the effect of applying perpendicular magnetic anisotropy from upper and lower layers of the first ferromagnetic layer 31 is relatively weakened, and the perpendicular magnetic anisotropy of the first ferromagnetic layer 31 is weakened.

When the film thickness of the first ferromagnetic layer 31 decreases, a volume as a ferromagnetic material decreases, and when the film thickness increases, the volume as a ferromagnetic material increases. Reactivity of the magnetization M31 of the first ferromagnetic layer 31 when an external energy is applied is inversely proportional to a product (KuV) of a magnetic anisotropy (Ku) and a volume (V) of the first ferromagnetic layer 31. That is, when the product of the magnetic anisotropy and the volume of the first ferromagnetic layer 31 decreases, the reactivity to light enhances. From the viewpoint as described above, in order to enhance the reactivity to light, the volume of the first ferromagnetic layer 31 may be reduced after appropriately designing the magnetic anisotropy of the first ferromagnetic layer 31.

When the film thickness of the first ferromagnetic layer 31 is larger than 2 nm, an insertion layer made of, for example, Mo or W may be provided in the first ferromagnetic layer 31. That is, a laminate in which a ferromagnetic layer, an insertion layer, and a ferromagnetic layer are laminated in that order may be used as the first ferromagnetic layer 31. The perpendicular magnetic anisotropy of the entire first ferromagnetic layer 31 enhances due to interfacial magnetic anisotropy at an interface between the insertion layer and the ferromagnetic layer. A film thickness of the insertion layer may be, for example, 0.1 nm to 0.6 nm.

The second ferromagnetic layer 32 is a magnetization fixed layer. The magnetization fixed layer is a layer made of a magnetic material in which a magnetization state is less likely to change than the magnetization free layer when a predetermined external energy is applied. For example, the magnetization fixed layer is less likely to change in magnetization direction than the magnetization free layer when a predetermined external energy is applied. Also, for example, the magnetization fixed layer less likely to change in an amount of magnetization than the magnetization free layer when a predetermined external energy is applied. A coercivity of the second ferromagnetic layer 32 is larger than, for example, a coercivity of the first ferromagnetic layer 31. The second ferromagnetic layer 32 has, for example, an axis of easy magnetization in the same direction as the first ferromagnetic layer 31. The second ferromagnetic layer 32 may be an in-plane magnetization film or a perpendicular magnetization film.

A material constituting the second ferromagnetic layer 32 is, for example, the same as that of the first ferromagnetic layer 31. The second ferromagnetic layer 32 may be a laminate in which, for example, Co having a thickness of 0.4 nm to 1.0 nm, Mo having a thickness of 0.1 nm to 0.5 nm, a CoFeB alloy having a thickness of 0.3 nm to 1.0 nm, and Fe having a thickness of 0.3 nm to 1.0 nm is laminated in that order.

The magnetization M32 of the second ferromagnetic layer 32 may be fixed by, for example, magnetic coupling with the third ferromagnetic layer 34 via the magnetic coupling layer 35. In this case, a combination of the second ferromagnetic layer 32, the magnetic coupling layer 35, and the third ferromagnetic layer 34 may be referred to as a magnetization fixed layer.

The third ferromagnetic layer 34 is magnetically coupled to, for example, the second ferromagnetic layer 32. The magnetic coupling is, for example, an antiferromagnetic coupling and is caused by an RKKY interaction. A material constituting the third ferromagnetic layer 34 is, for example, the same as that of the first ferromagnetic layer 31. The magnetic coupling layer 35 may be, for example, Ru, Ir, or the like.

The spacer layer 33 is a non-magnetic layer disposed between the first ferromagnetic layer 31 and the second ferromagnetic layer 32. The spacer layer 33 is constituted by a layer formed of a conductor, an insulator, or a semiconductor, or a layer including an energizing point formed of a conductor in an insulator. A film thickness of the spacer layer 33 can be adjusted according to an orientation direction of the magnetization M31 of the first ferromagnetic layer 31 and the magnetization M32 of the second ferromagnetic layer 32 in an initial state to be described later.

For example, when the spacer layer 33 is made of an insulator, the magnetic element 30 has a magnetic tunnel junction (MTJ) formed of the first ferromagnetic layer 31, the spacer layer 33, and the second ferromagnetic layer 32. Such an element is called an MTJ element. In this case, the magnetic element 30 can exhibit a tunneling magnetoresistance (TMR) effect. When the spacer layer 33 is made of a metal, the magnetic element 30 can exhibit a giant magnetoresistance (GMR) effect. Such an element is called a GMR element. The magnetic element 30 may be referred to as an MTJ element, a GMR element, or the like depending on a constituent material of the spacer layer 3, but is also collectively referred to as a magnetoresistance effect element.

When the spacer layer 33 is formed of an insulating material, a material containing aluminum oxide, magnesium oxide, titanium oxide, silicon oxide, or the like can be used. Also, the spacer layer 33 may contain elements such as Al, B, Si, and Mg or magnetic elements such as Co, Fe, and Ni in the above-described insulating materials. When the film thickness of the spacer layer 33 is adjusted so that a high TMR effect is exhibited between the first ferromagnetic layer 31 and the second ferromagnetic layer 32, a high magnetoresistance change rate can be obtained. In order to efficiently utilize the TMR effect, the film thickness of the spacer layer 33 may be about 0.5 to 5.0 nm or about 1.0 to 2.5 nm.

When the spacer layer 33 is formed of a non-magnetic conductive material, a conductive material such as Cu, Ag, Au, or Ru can be used. In order to efficiently utilize the GMR effect, the film thickness of the spacer layer 33 may be about 0.5 to 5.0 nm or about 2.0 to 3.0 nm.

When the spacer layer 33 is formed of a non-magnetic semiconductor material, a material such as zinc oxide, indium oxide, tin oxide, germanium oxide, gallium oxide, or ITO can be used. In this case, the film thickness of the spacer layer 33 may be about 1.0 to 4.0 nm.

When a layer in which an energizing point formed of a conductor is included in a non-magnetic insulator is applied as the spacer layer 33, a structure in which an energizing point formed of a non-magnetic conductor such as Cu, Au, or Al is included in a non-magnetic insulator formed of aluminum oxide or magnesium oxide may be used. Also, the conductor may be formed of a magnetic element such as Co, Fe, or Ni. In this case, the film thickness of the spacer layer 33 may be about 1.0 to 2.5 nm. The energizing point is, for example, a columnar body having a diameter of 1 nm or more and 5 nm or less when viewed from a direction perpendicular to the film surface.

The underlayer 36 is between the second ferromagnetic layer 32 and the electrode 52. The underlayer 36 is a seed layer or a buffer layer. The seed layer enhances crystallinity of a layer laminated on the seed layer. The seed layer may be, for example, Pt, Ru, Hf, Zr, or NiFeCr. A film thickness of the seed layer may be, for example, 1 nm or more and 5 nm or less. The buffer layer is a layer that alleviates lattice mismatching between different crystals. The buffer layer may be, for example, Ta, Ti, W, Zr, Hf or a nitride of these elements. A film thickness of the buffer layer may be, for example, 1 nm or more and 5 nm or less.

The cap layer 38 is between the first ferromagnetic layer 31 and the electrode 51. The cap layer 38 prevents damage to a lower layer during the process and enhances crystallinity of the lower layer during annealing. A film thickness of the cap layer 38 may be, for example, 3 nm or less so that the first ferromagnetic layer 31 is irradiated with sufficient light. The cap layer 38 may be formed of, for example, MgO, W, Mo, Ru, Ta, Cu, Cr, or a laminated film thereof.

The perpendicular magnetization inducing layer 37 is formed when the first ferromagnetic layer 31 is a perpendicular magnetization film. The perpendicular magnetization inducing layer 37 is laminated on the first ferromagnetic layer 31. The perpendicular magnetization inducing layer 37 induces perpendicular magnetic anisotropy of the first ferromagnetic layer 31. The perpendicular magnetization inducing layer 37 may be, for example, magnesium oxide, W, Ta, Mo, or the like. When the perpendicular magnetization inducing layer 37 is magnesium oxide, the magnesium oxide may be oxygen deficient in order to enhance conductivity. A film thickness of the perpendicular magnetization inducing layer 37 may be, for example, 0.5 nm or more and 2.0 nm or less.

The side wall insulating layer 39 covers a periphery of the laminate including the first ferromagnetic layer 31 and the second ferromagnetic layer 32. The side wall insulating layer 39 may be, for example, an oxide, a nitride, or an oxynitride of Si, Al, or Mg.

The magnetic element 30 is manufactured by a lamination step, an annealing step, and a processing step for each layer. First, the electrode 52, the underlayer 36, the third ferromagnetic layer 34, the magnetic coupling layer 35, the second ferromagnetic layer 32, the spacer layer 33, the first ferromagnetic layer 31, the perpendicular magnetization inducing layer 37, and the cap layer 38 are laminated in that order on the substrate 10 (on a part of the clad 28). The substrate 10 is the same as the substrate on which the waveguide 20 is formed. Each layer is formed by, for example, sputtering.

Then, the laminated film is annealed. An annealing temperature may be, for example, 250° C. to 450° C. Thereafter, the laminated film is processed into a predetermined columnar body by photolithography and etching. The columnar body may be a circular column or a prismatic column. For example, a minimum width when the columnar body is viewed from the lamination direction may be 10 nm or more and 2000 nm or less, or 30 nm or more and 500 nm or less.

Next, an insulating layer is formed to cover a lateral surface of the columnar body. The insulating layer is the side wall insulating layer 39. The side wall insulating layer 39 may be laminated a plurality of times. Next, an upper surface of the cap layer 38 is exposed from the side wall insulating layer 39 by chemical mechanical polishing (CMP), and the electrode 51 is manufactured on the cap layer 38. With the above-described steps, the magnetic element 30 is obtained. The magnetic element 30 can be manufactured regardless of a material constituting the base. Therefore, the magnetic element 30 can be directly manufactured on the substrate 10 on which the waveguide 20 is formed without interposing an adhesive layer or the like. The magnetic element 30 can be formed by processes on the same substrate 10 together with the waveguide 20. For example, the waveguide 20 and the magnetic element 30 can be formed on the same substrate 10 by a vacuum deposition process.

The electrodes 41, 42, 43, and 44 are located at positions where an electric field can be applied to at least a part of the waveguide 20 (see FIGS. 2 and 3). An electric field can be applied to the first waveguide 21 from each of the electrodes 41 and 43. Each of the electrodes 41 and 43 is located at a position where it overlaps the first waveguide 21 in a plan view in the z direction, for example. Each of the electrodes 41 and 43 is located above the first waveguide 21. An electric field can be applied to the second waveguide 22 from each of the electrodes 42 and 44. Each of the electrodes 42 and 44 is located at a position where it overlaps the second waveguide 22 in a plan view in the z direction, for example. Each of the electrodes 42 and 44 is located above the second waveguide 22.

Next, an operation of the optical device 200 will be described. The operation of the optical device 200 includes an optical modulation operation for converting an electric signal into an optical signal and an adjustment operation for monitoring an optical modulation state and adjusting the optical modulation state.

First, the optical modulation operation will be described. The optical device 200 converts an electric signal into an optical signal. The optical modulation element 100 modulates the input light $L_{in}$ into the output light $L_{out}$.

The input light $L_{in}$ input from the input waveguide 23 branches into the first waveguide 21 and the second waveguide 22 and propagates. A phase difference between the light propagating in the first waveguide 21 and the light propagating in the second waveguide 22 is zero at the time of branching.

When a voltage is applied between the electrode 41 and the electrode 42, an electric field is applied to the first waveguide 21 and the second waveguide 22, and a refractive index of each of the first waveguide 21 and the second waveguide 22 changes due to an electro-optical effect. The modulation voltage Vm corresponding to the modulation signal Sm is applied to the electrodes 41 and 42. The modulation voltage Vm corresponding to the modulation signal Sm is applied from the power supply 161, for example. For example, the refractive index of the first waveguide 21 changes by +Δn from a reference refractive index n, and the refractive index of the second waveguide 22 changes by −Δn from the reference refractive index n. The voltages applied to the electrode 41 and the electrode 42 are, for example, differential voltages which have the same absolute value, in which a positive voltage and a negative voltage are opposite to each other, and in which phases are not deviated to each other.

When the refractive indexes of the first waveguide 21 and the second waveguide 22 are different, a phase difference occurs between the light propagating in the first waveguide 21 and the light propagating in the second waveguide 22. The light propagating in the first waveguide 21 and the light propagating in the second waveguide 22 merge at the output waveguide 24, and the merged light is output as output light $L_{out}$.

The output light $L_{out}$ is a combination of the light propagating in the first waveguide 21 and the light propagating in the second waveguide 22. The intensity of the output light $L_{out}$ changes according to the phase difference between the light propagating in the first waveguide 21 and the light propagating in the second waveguide 22. For example, when the phase difference is an even multiple of π, the light strengthens, and when the phase difference is an odd multiple of π, the light weakens. In such a procedure, the optical modulation element 100 modulates the input light $L_{in}$ into the output light $L_{out}$ according to the electric signal.

Next, the adjustment operation will be described. In the adjustment operation, for example, an operating point of the optical modulation element 100 is adjusted. The operating point is a voltage that is a center of a modulation voltage amplitude. The operating point may fluctuate according to the temperature of the usage environment and the like. If the operating point fluctuates during use, it is corrected by the DC bias application circuit 170 and the control circuit 180. The control circuit 180 corrects the fluctuation of the operating point according to, for example, the state of the monitoring light. The state of the monitoring light is detected by the magnetic element 30.

The output voltage or output current from the magnetic element 30 changes according to the intensity of the light applied to the first ferromagnetic layer 31 (the monitoring light). The monitoring light is some of the branched output light $L_{out}$ and is in the same state as the output light $L_{out}$.

The exact mechanism by which the output voltage or output current from the magnetic element 30 changes due to the application of the light has not yet been clarified, but for example, the following two mechanisms can be considered.

Figure 9:
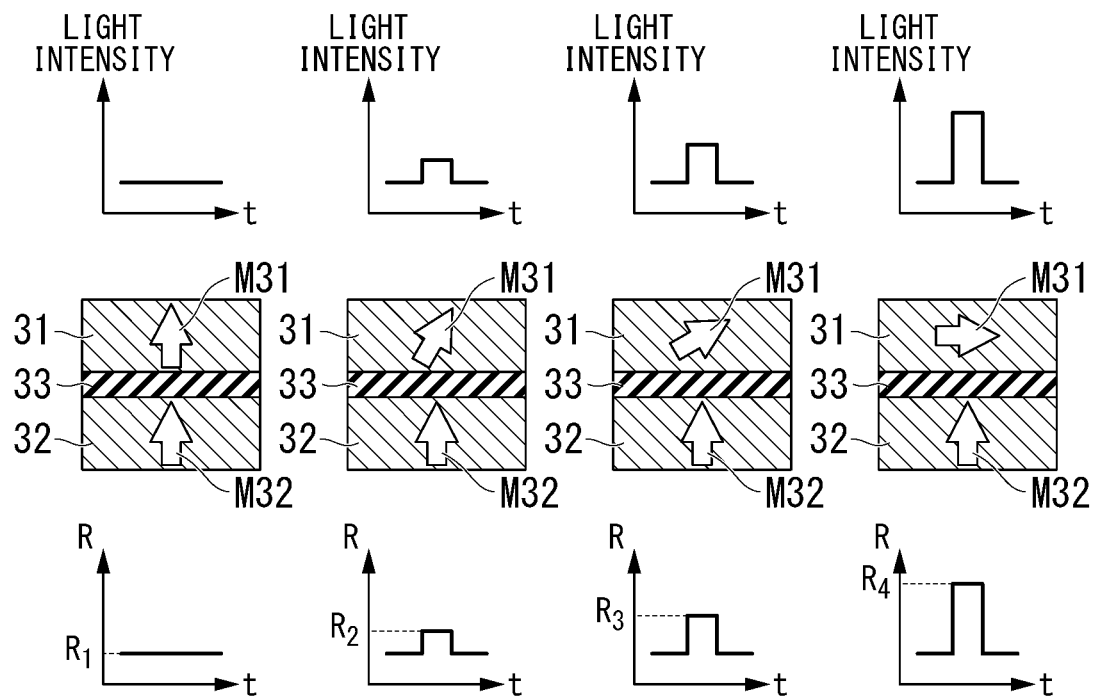
FIG. 9 is a diagram for explaining a first mechanism of the magnetic element according to the first embodiment.

FIG. 9 is a diagram for explaining a first mechanism of operation of the magnetic element 30 according to the first embodiment. In the upper graph of FIG. 9, the vertical axis represents an intensity of light applied to the first ferromagnetic layer 31, and the horizontal axis represents time. In the lower graph of FIG. 9, the vertical axis represents a resistance value of the magnetic element 30 in the lamination direction, and the horizontal axis represents time.

First, in a state in which light of a first intensity is applied to the first ferromagnetic layer 31 (hereinafter referred to as an initial state), the magnetization M31 of the first ferromagnetic layer 31 and the magnetization M32 of the second ferromagnetic layer 32 are in a parallel relationship, the resistance value of the magnetic element 30 in the lamination direction indicates a first resistance value $R_1$, and an amount of the output voltage or the output current from the magnetic element 30 indicates a first value. The first intensity may be a case in which the intensity of the light applied to the first ferromagnetic layer 31 is zero.

The resistance value of the magnetic element 30 in the lamination direction is obtained, for example, by using Ohm's law from voltage values that are generated at both ends of the magnetic element 30 in the lamination direction when a sense current is caused to flow in the lamination direction of the magnetic element 30. The output voltage from the magnetic element 30 is generated between the electrode 51 and the electrode 52. In the case of the example illustrated in FIG. 9, the sense current may flow from the first ferromagnetic layer 31 toward the second ferromagnetic layer 32. When the sense current is caused to flow in this direction, a spin transfer torque in the same direction as the magnetization M32 of the second ferromagnetic layer 32 acts on the magnetization M31 of the first ferromagnetic layer 31, and the magnetization M31 and the magnetization M32 become parallel in the initial state. Also, when the sense current is caused to flow in this direction, the magnetization M31 of the first ferromagnetic layer 31 can be prevented from being reversed during operation.

Next, an intensity of the light applied to the first ferromagnetic layer 31 changes. The magnetization M31 of the first ferromagnetic layer 31 is inclined from the initial state by an external energy due to the irradiation of light. An angle between a direction of the magnetization M31 of the first ferromagnetic layer 31 when the first ferromagnetic layer 31 is not irradiated with the light and a direction of the magnetization M31 when the first ferromagnetic layer 31 is irradiated with the light is larger than 0° and smaller than 90°.

When the magnetization M31 of the first ferromagnetic layer 31 is inclined from the initial state, the resistance value of the magnetoresistance effect element 30 in the lamination direction changes. Then, the output voltage or the output current from the magnetic element 30 changes. For example, an inclination of the magnetization M31 with respect to that in the initial state increases as the intensity of the light (the monitoring light L) applied to the magnetic element 30 increases. For example, according to the inclination of the magnetization M31 of the first ferromagnetic layer 31, the resistance value of the magnetic element 30 in the lamination direction changes to a second resistance value $R_2$, a third resistance value $R_3$, and a fourth resistance value $R_4$, and the output voltage or the output current from the magnetic element 30 changes to a second value, a third value, and a fourth value. The resistance value increases in the order of the first resistance value $R_1$, the second resistance value $R_2$, the third resistance value $R_3$, and the fourth resistance value $R_4$. The output voltage from the magnetic element 30 increases in the order of the first value, the second value, the third value, and the fourth value. When the magnetic element 30 is connected to a constant voltage source, the output current from the magnetic element 30 decreases in the order of the first value, the second value, the third value, and the fourth value.

In the magnetic element 30, when the intensity of the light (the monitoring light L) applied to the magnetic element 30 changes, the output voltage or the output current from the magnetic element 30 (resistance value of the magnetic element 30 in the lamination direction) changes. Therefore, the magnetic element 30 can detect an intensity of the monitoring light L as an output voltage or an output current (resistance value of the magnetic element 30) from the magnetic element 30.

Since a spin transfer torque in the same direction as the magnetization M32 of the second ferromagnetic layer 32 acts on the magnetization M31 of the first ferromagnetic layer 31, when the intensity of the light applied to the first ferromagnetic layer 31 returns to the first intensity, the magnetization M31 that has been inclined from the initial state returns to the initial state. When the magnetization M31 returns to the initial state, the resistance value of the magnetic element 30 in the lamination direction returns to the first resistance value $R_1$, and the output voltage or the output current from the magnetic element 30 returns to the first value.

Here, a case in which the magnetization M31 and the magnetization M32 are parallel to each other in the initial state has been described as an example, but the magnetization M31 and the magnetization M32 may be anti-parallel to each other in the initial state. In this case, the resistance value of the magnetic element 30 in the lamination direction becomes smaller as the magnetization M31 becomes more inclined (as the angle change from the initial state of the magnetization M31 becomes larger). When the initial state is a case in which the magnetization M31 and the magnetization M32 are anti-parallel to each other, the sense current may flow from the second ferromagnetic layer 32 toward the first ferromagnetic layer 31. When the sense current is caused to flow in this direction, the spin transfer torque acts on the magnetization M31 of the first ferromagnetic layer 31 in a direction opposite to the magnetization M32 of the second ferromagnetic layer 32, and the magnetization M31 and the magnetization M32 become anti-parallel to each other in the initial state.

Figure 10:
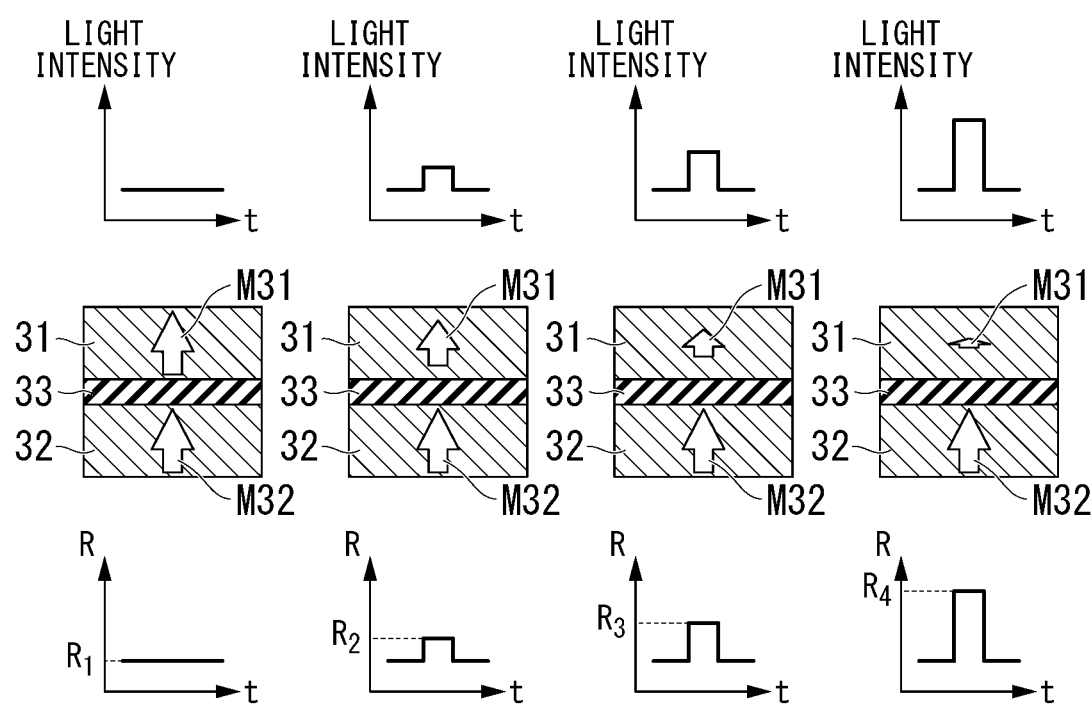
FIG. 10 is a diagram for explaining a second mechanism of the magnetic element according to the first embodiment.

FIG. 10 is a diagram for explaining a second mechanism of an operation of the magnetic element 30 according to the first embodiment. In upper graphs of FIG. 10, a vertical axis represents the intensity of the light applied to the first ferromagnetic layer 31, and a horizontal axis represents time. In lower graphs in FIG. 10, a vertical axis represents a resistance value of the magnetic element 30 in the lamination direction, and a horizontal axis represents time.

An initial state illustrated in FIG. 10 is the same as the initial state illustrated in FIG. 9. Also in the case of the example illustrated in FIG. 10, a sense current may flow from the first ferromagnetic layer 31 toward the second ferromagnetic layer 32. When the sense current is caused to flow in this direction, a spin transfer torque in the same direction as the magnetization M32 of the second ferromagnetic layer 32 acts on the magnetization M31 of the first ferromagnetic layer 31, and the initial state is maintained.

Next, an intensity of the light (monitoring light) applied to the first ferromagnetic layer 31 changes. An amount of the magnetization M31 of the first ferromagnetic layer 31 decreases from the initial state by an external energy due to the irradiation of light. When the magnetization M31 of the first ferromagnetic layer 31 decreases from the initial state, a resistance value of the magnetoresistance effect element 30 in the lamination direction changes. Then, an output voltage or an output current from the magnetic element 30 changes. For example, the amount of the magnetization M31 decreases as the intensity of the light (the monitoring light L) applied to the magnetic element 30 increases. For example, according to the amount of the magnetization M31 of the first ferromagnetic layer 31, the resistance value of the magnetic element 30 in the lamination direction changes to a second resistance value $R_2$, a third resistance value $R_3$, and a fourth resistance value $R_4$, and the output voltage or the output current from the magnetic element 30 changes to a second value, a third value, and a fourth value. The resistance value increases in the order of the first resistance value $R_1$, the second resistance value $R_2$, the third resistance value $R_3$, and the fourth resistance value $R_4$. The output voltage from the magnetic element 30 increases in the order of the first value, the second value, the third value, and the fourth value. When the magnetic element 30 is connected to a constant voltage source, the output current from the magnetic element 30 decreases in the order of the first value, the second value, the third value, and the fourth value.

When the intensity of the light applied to the first ferromagnetic layer 31 returns to the first intensity, the amount of the magnetization M31 of the first ferromagnetic layer 31 returns to an original amount, and the magnetic element 30 returns to the initial state. That is, the resistance value of the magnetic element 30 in the lamination direction returns to the first resistance value $R_1$, and the output voltage or the output current from the magnetic element 30 returns to the first value.

Also in FIG. 10, the magnetization M31 and the magnetization M32 may be anti-parallel to each other in the initial state. In this case, the resistance value of the magnetic element 30 in the lamination direction decreases as the amount of the magnetization M31 decreases. When the initial state is a case in which the magnetization M31 and the magnetization M32 are anti-parallel to each other, the sense current may flow from the second ferromagnetic layer 32 toward the first ferromagnetic layer 31.

Through the above procedure, the state of the output light $L_{out}$ can be read as the output voltage or output current from the magnetic element 30 (the resistance value of the magnetic element 30 in the lamination direction).

The control circuit 180 receives the output voltage or output current from the magnetic element 30 (the resistance value of the magnetic element 30 in the lamination direction), that is, the electric signal from the magnetic element 30 and sends a signal based on the result to the DC bias application circuit 170. The DC bias application circuit 170 applies a DC bias voltage Vdc between the electrode 43 and the electrode 44 on the basis of the signal from the control circuit 180 and applies an electric field to the first waveguide 21 and the second waveguide 22 to adjust the operating point of the optical modulation element 100. The DC bias voltage Vdc is applied from the power supply 171, for example. In this way, the control part 150 applies the electric field whose magnitude is adjusted on the basis of the electric signal from the magnetic element 30 to the first waveguide 21 and the second waveguide 22 from the electrode 43 and the electrode 44.

As described above, in the optical device 200 according to the first embodiment, the electric field based on the electrical signal from the magnetic element 30 can be applied to at least a part of the waveguide 20 (the first waveguide 21 and the second waveguide 22) from the electrode 43 and the electrode 44. By the feedback operation as described above, the state of the signal (the output light $L_{out}$) output from the optical device 200 can be adjusted.

Also, the magnetization M31 of the first ferromagnetic layer 31 is more likely to change with respect to light irradiation as a volume of the first ferromagnetic layer 31 decreases. That is, as the volume of the first ferromagnetic layer 31 decreases, the magnetization M31 of the first ferromagnetic layer 31 is more likely to be inclined by irradiation of light, or more likely to become smaller by irradiation of light. In other words, when the volume of the first ferromagnetic layer 31 is made small, the magnetization M31 can be changed even with a small amount of light. That is, the magnetic element 30 according to the first embodiment can detect light with high sensitivity.

More accurately, ease of change in the magnetization M31 is determined by an amount of the product (KuV) of the magnetic anisotropy (Ku) and the volume (V) of the first ferromagnetic layer 31. As the KuV decreases, the magnetization M31 changes even with a smaller amount of light, and as the KuV increases, the magnetization M31 does not change unless the amount of light becomes larger. That is, the KuV of the first ferromagnetic layer 31 is designed according to an amount of light applied from the outside used in the application. When a case of detecting an extremely small amount of light is assumed, the extremely small amount of light can be detected by reducing the KuV of the first ferromagnetic layer 31. Such a detection for a small amount of light has a great advantage because it is difficult when an element size is reduced in a conventional p-n junction semiconductor. The KuV can be reduced by reducing the volume of the first ferromagnetic layer 31.

In the optical device and the optical system according to the above-described embodiments light can be monitored by a novel principle.

Second Embodiment

Figure 11:
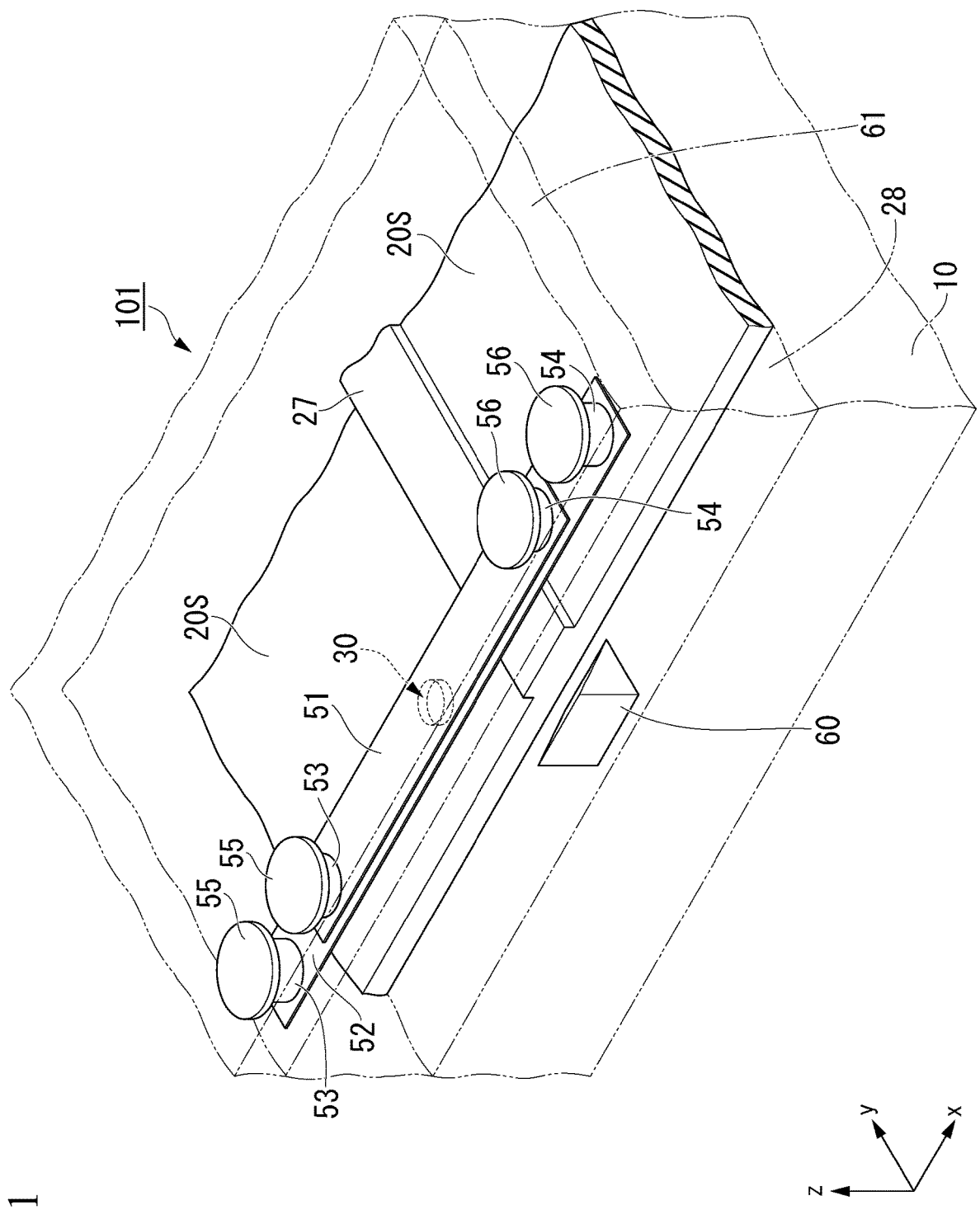
FIG. 11 is a perspective view of the vicinity of a magnetic element of an optical modulation element according to a second embodiment.
Figure 12:
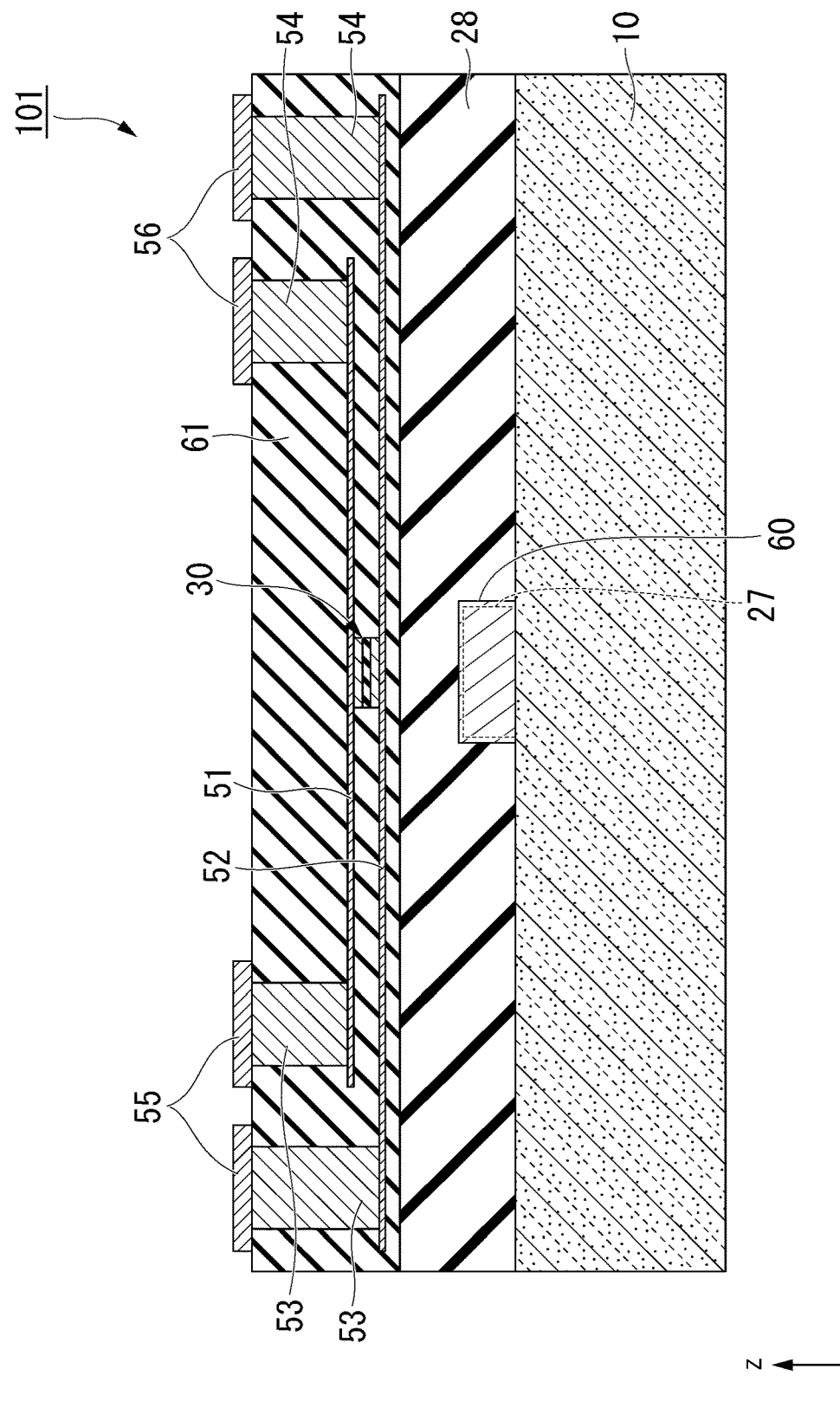
FIG. 12 is a cross-sectional view of the vicinity of the magnetic element of the optical modulation element according to the second embodiment.
Figure 13:
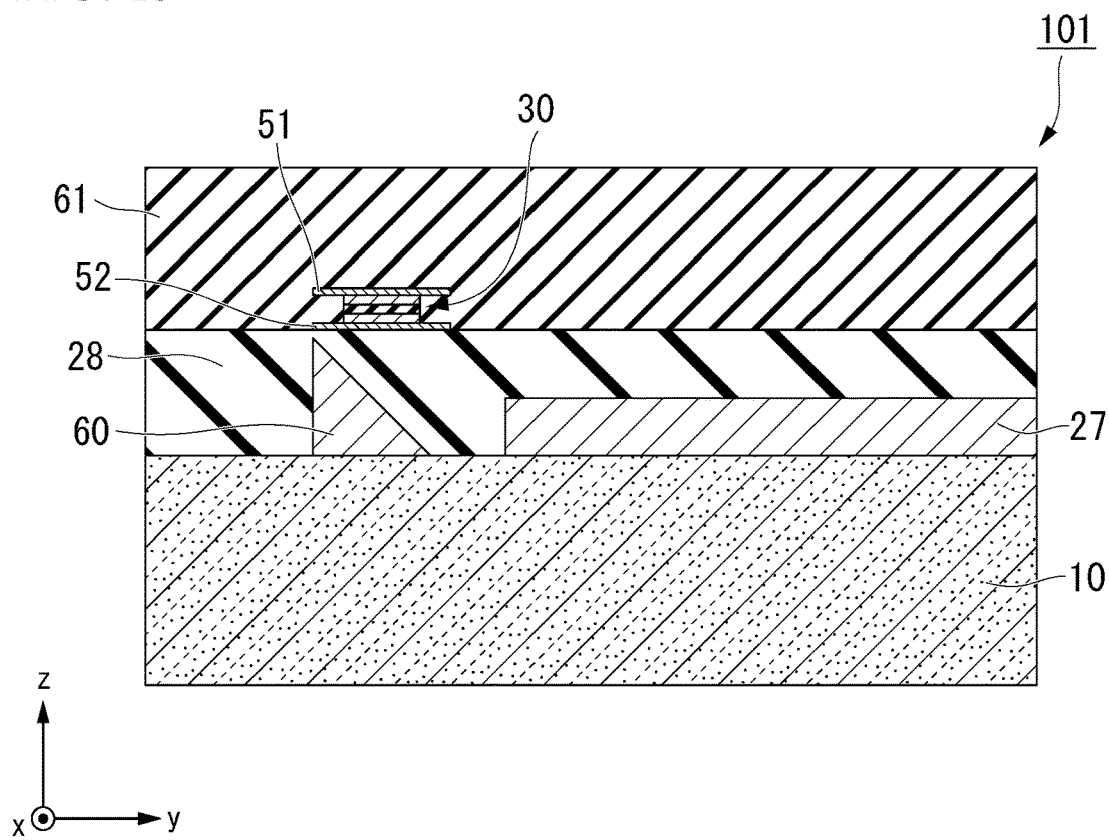
FIG. 13 is another cross-sectional view of the vicinity of the magnetic element of the optical modulation element according to the second embodiment.

FIG. 11 is a perspective view of the vicinity of a magnetic element 30 of an optical modulation element 101 according to a second embodiment. FIG. 12 is a cross-sectional view of the vicinity of the magnetic element 30 of the optical modulation element 101 according to the second embodiment. FIG. 13 is another cross-sectional view of the vicinity of the magnetic element 30 of the optical modulation element 101 according to the second embodiment. In the second embodiment, the same constituent elements as those in the first embodiment are designated by the same reference signs, and the description thereof will be omitted.

The optical modulation element 101 has a reflector 60. The reflector 60 reflects at least some of the light propagating in the waveguide 20 toward the magnetic element 30. For example, the reflector 60 reflects the monitoring light output from the monitoring waveguide 27 toward the magnetic element 30. The reflector 60 is located at a position in a traveling direction of the monitoring light from the output terminal of the monitoring waveguide 27. The reflector 60 has an inclined surface that is inclined with respect to the traveling direction of the monitoring light.

The reflector 60 reflects light. The reflector 60 is, for example, a reflecting mirror.

The magnetic element 30 is formed in an insulating layer 61 formed on the clad 28. The insulating layer 61 is made of the same material as the side wall insulating layer 39, for example. The magnetic element 30 is located above the substrate 10. The magnetic element 30 is located at a height position different from that of the waveguide 20 and is located at a position farther away from the substrate 10 than the waveguide 20. The magnetic element 30 is located, for example, above the reflector 60.

The light reflected by the reflector 60 (the monitoring light) is applied to, for example, the magnetic element 30 from the lamination direction of the magnetic element 30. In this case, the electrode 52 has transparency in the wavelength range of the light applied to the magnetic element 30. When the electrode 52 transmits some of the monitoring light, the magnetic element 30 is irradiated with the monitoring light. Here, an example in which the electrode 52 is disposed closer to the reflector 60 than the electrode 51 is illustrated, but the electrode 51 may be disposed closer to the reflector 60 than the electrode 52 (the first ferromagnetic layer 31 may be disposed closer to the reflector 60 than the second ferromagnetic layer 32). In this case, the electrode 51 has transparency in the wavelength range of the light applied to the magnetic element 30. When the electrode 51 is disposed closer to the reflector 60 than the electrode 52, the efficiency of irradiating the first ferromagnetic layer 31 with the monitoring light increases.

The optical device according to the second embodiment has the same effect as the optical device 200. Further, due to the reflector 60, it is possible to freely design an application direction of the monitoring light to the magnetic element 30. For example, when the monitoring light is applied to the magnetic element 30 from the lamination direction, a wide light receiving area of the magnetic element 30 can be secured.

Third Embodiment

Figure 14:
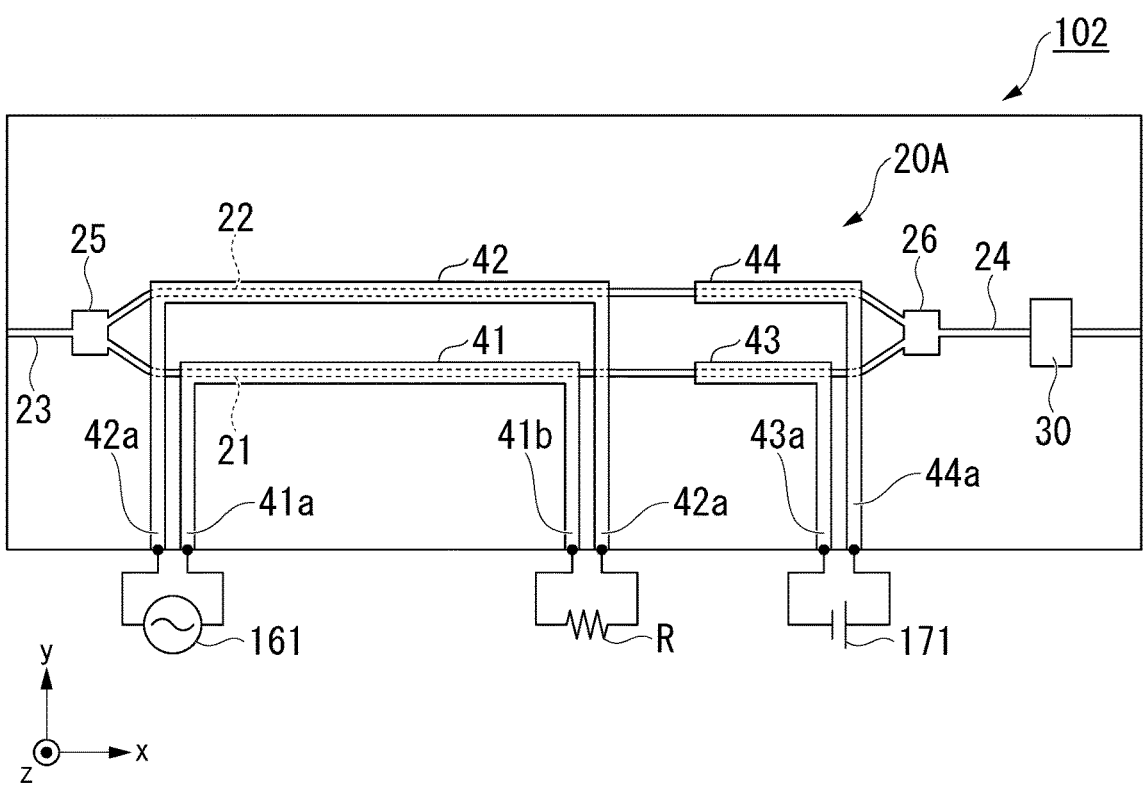
FIG. 14 is a plan view of an optical modulation element according to a third embodiment.

FIG. 14 is a plan view of an optical modulation element 102 according to a third embodiment. FIG. 14 shows the power supplies 161 and 171 and the terminating resistor R together. In the third embodiment, the same constituent elements as those in the first embodiment and the second embodiment are designated by the same reference signs, and the description thereof will be omitted.

A waveguide 20A has, for example, a first waveguide 21, a second waveguide 22, an input waveguide 23, an output waveguide 24, a branch portion 25, and a coupling portion 26. The waveguide 20A does not have a monitoring waveguide 27.

Figure 15:
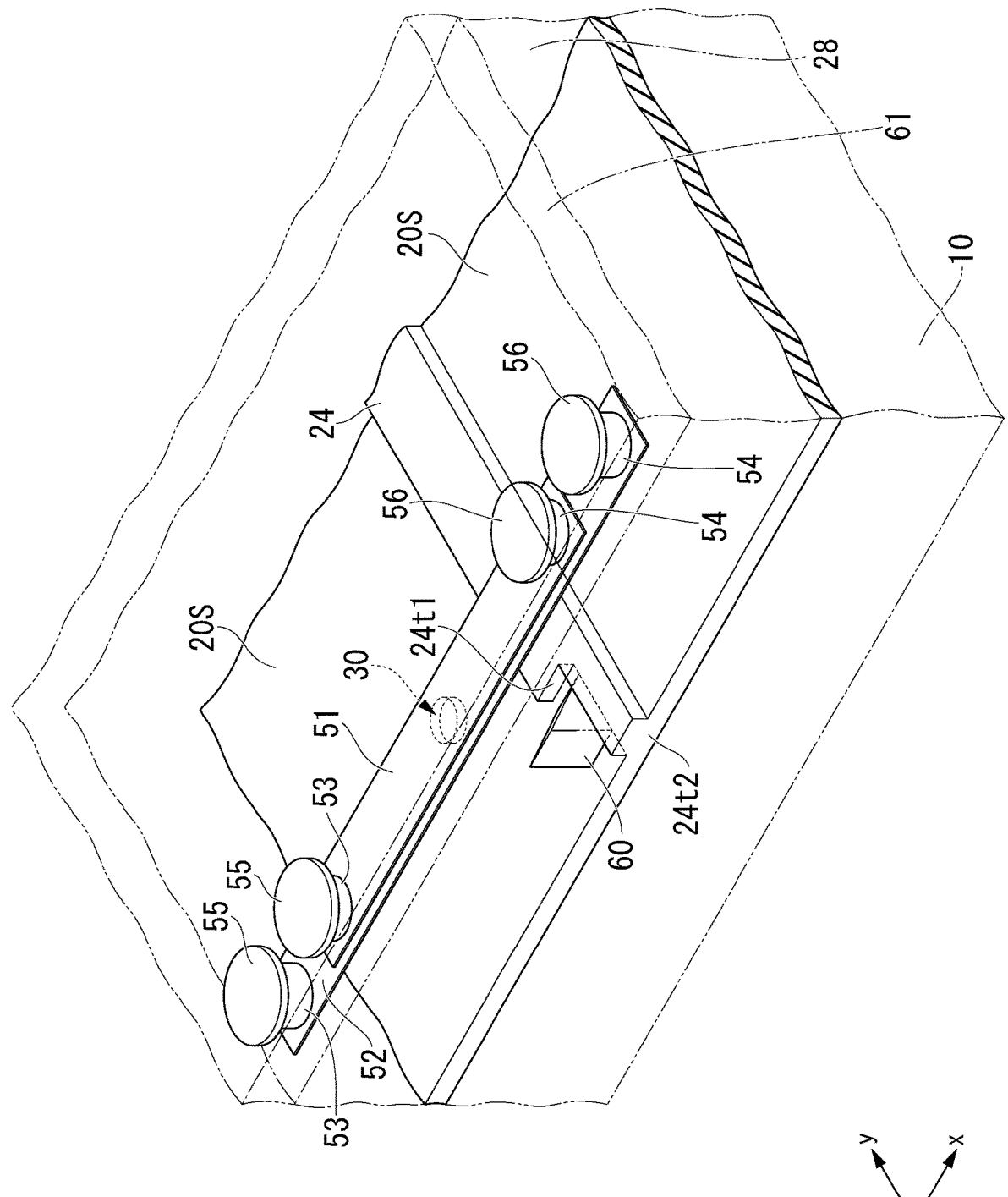
FIG. 15 is a perspective view of a first example of the vicinity of a magnetic element of the optical modulation element according to the third embodiment.

FIG. 15 is a perspective view of a first example of the vicinity of a magnetic element 30 of the optical modulation element 102 according to the third embodiment. In FIG. 15, the output waveguide 24 has two separate output terminals 24t1 and 24t2. The output terminal 24t1 is located at a position different from that of the output end 24t2 in the x direction.

A reflector 60 is located at the end of in a traveling direction of light from the output terminal 24t1. The light reflected by the reflector 60 is applied to the magnetic element 30 as the monitoring light. That is, some of the light output from the output terminal of the output waveguide 24 is applied to the magnetic element 30 as the monitoring light. The output terminal 24t2 is exposed to the outside. The output light $L_{out}$ is output from the output terminal 24t2.

Figure 16:
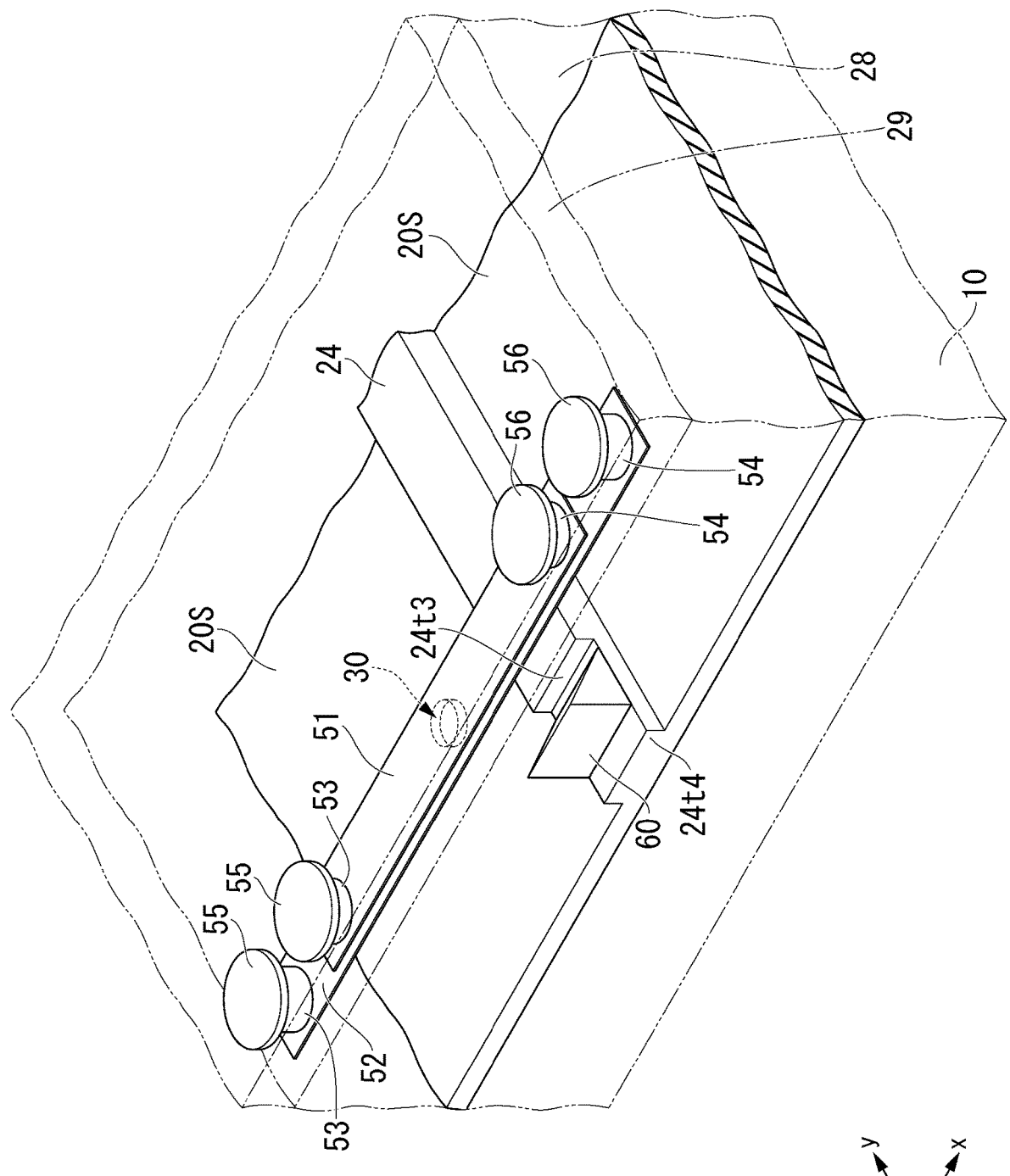
FIG. 16 is a perspective view of a second example of the vicinity of the magnetic element of the optical modulation element according to the third embodiment.

FIG. 16 is a perspective view of a second example of the vicinity of the magnetic element 30 of the optical modulation element 102 according to the third embodiment. In FIG. 16, the output waveguide 24 has two separate output terminals 24t3 and 24t4. The output terminal 24t3 is located at a position different from that of the output end 24t4 in the z direction.

A reflector 60 is located at the end of in a traveling direction of light from the output terminal 24t3. The light reflected by the reflector 60 is applied to the magnetic element 30 as the monitoring light. That is, some of the light output from the output terminal of the output waveguide 24 is applied to the magnetic element 30 as the monitoring light. The output terminal 24t4 is exposed to the outside. The output light $L_{out}$ is output from the output terminal 24t4.

The optical device according to the third embodiment has the same effect as the optical device 200. Further, since the optical modulation element 102 directly measures some of the output light $L_{out}$ from the output waveguide 24 as the monitoring light, it is not easily affected by noise or the like.

So far, examples of the first to third embodiments have been described in detail with reference to the drawings, but the first to third embodiments are not limited to these examples.

First Modification Example

Figure 17:
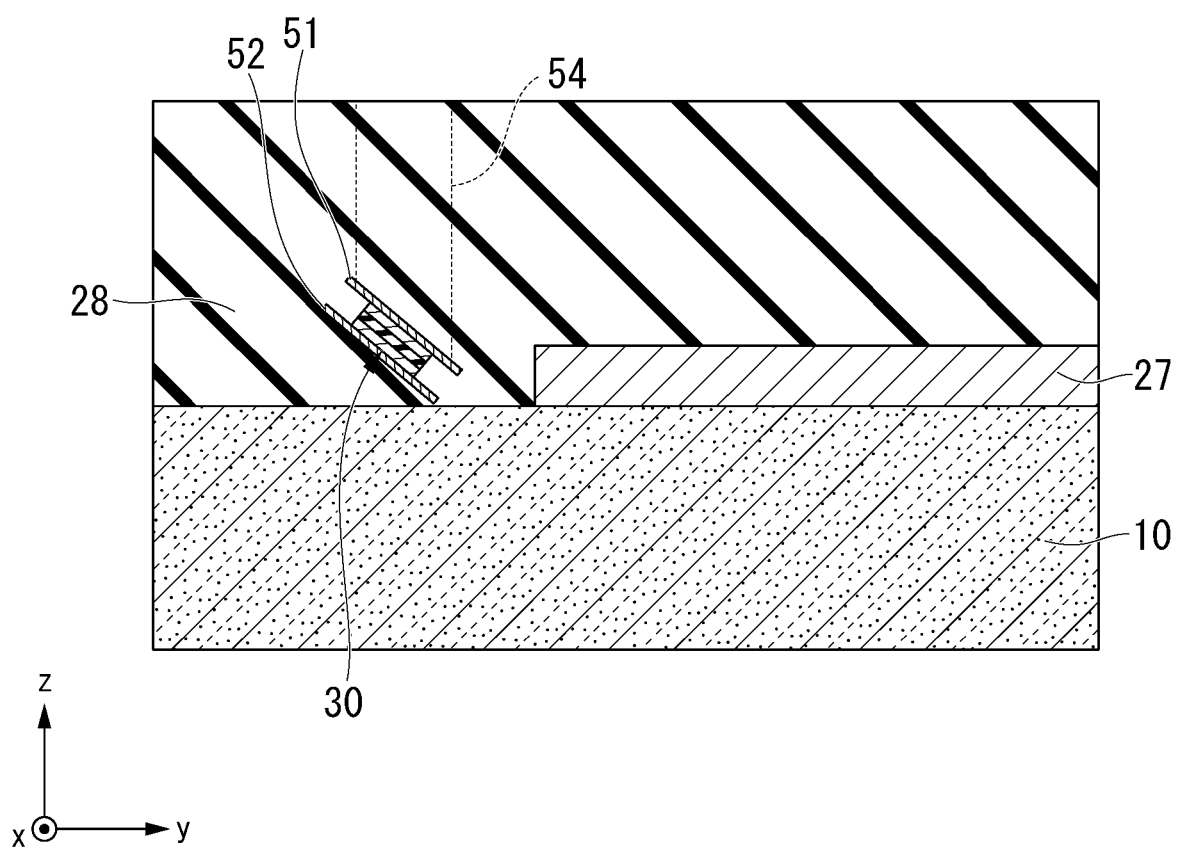
FIG. 17 is a cross-sectional view of the vicinity of a magnetic element of an optical modulation element according to a first modification example.

FIG. 17 is a cross-sectional view of the vicinity of a magnetic element of an optical modulation element according to a first modification example. As shown in FIG. 17, the lamination direction of the magnetic element 30 may be inclined with respect to the z direction. In this case, the monitoring light is applied to a side surface of the magnetic element 30 and a first surface of the magnetic element 30 on a side of the electrode 51.

Second Modification Example

Figure 18:
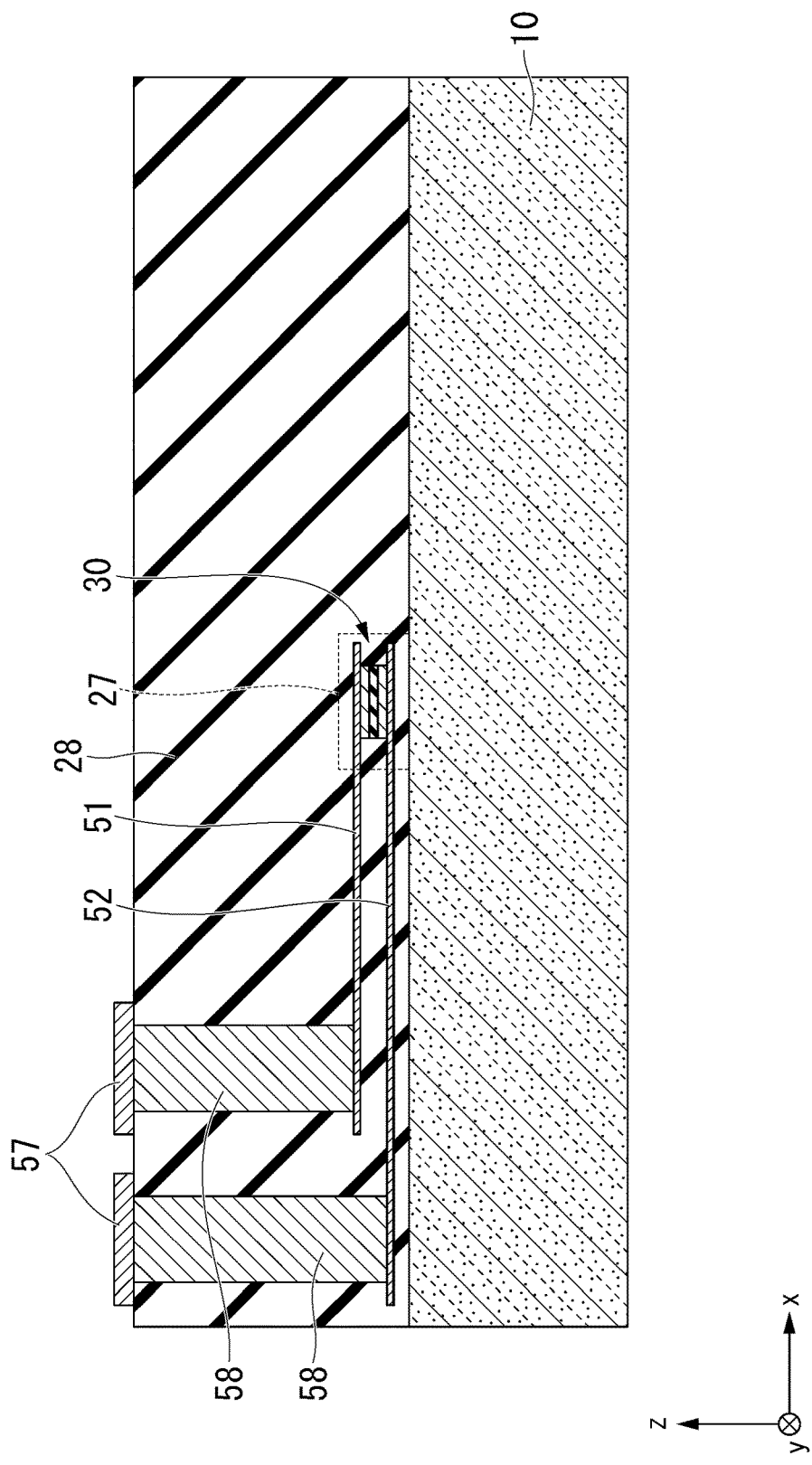
FIG. 18 is a cross-sectional view of the vicinity of a magnetic element of an optical modulation element according to a second modification example.

FIG. 18 is a cross-sectional view of the vicinity of a magnetic element of an optical modulation element according to a second modification example. For example, as shown in FIG. 18, the input terminal and the output terminal for the magnetic element 30 may be common. The magnetic element 30 shown in FIG. 18 is electrically connected to, for example, electrodes 51 and 52, a via wiring 58, and an input and output terminal 57.

The via wiring 58 connects the input and output terminal 57 to the electrode 51 or the electrode 52. There are, for example, two input and output terminals 57. A current or voltage is input to one of the input and output terminals 57, and a signal is output from one of the input and output terminals 57. The other of the input and output terminals 57 is connected to the reference electric potential.

Third Modification Example

Figure 19:
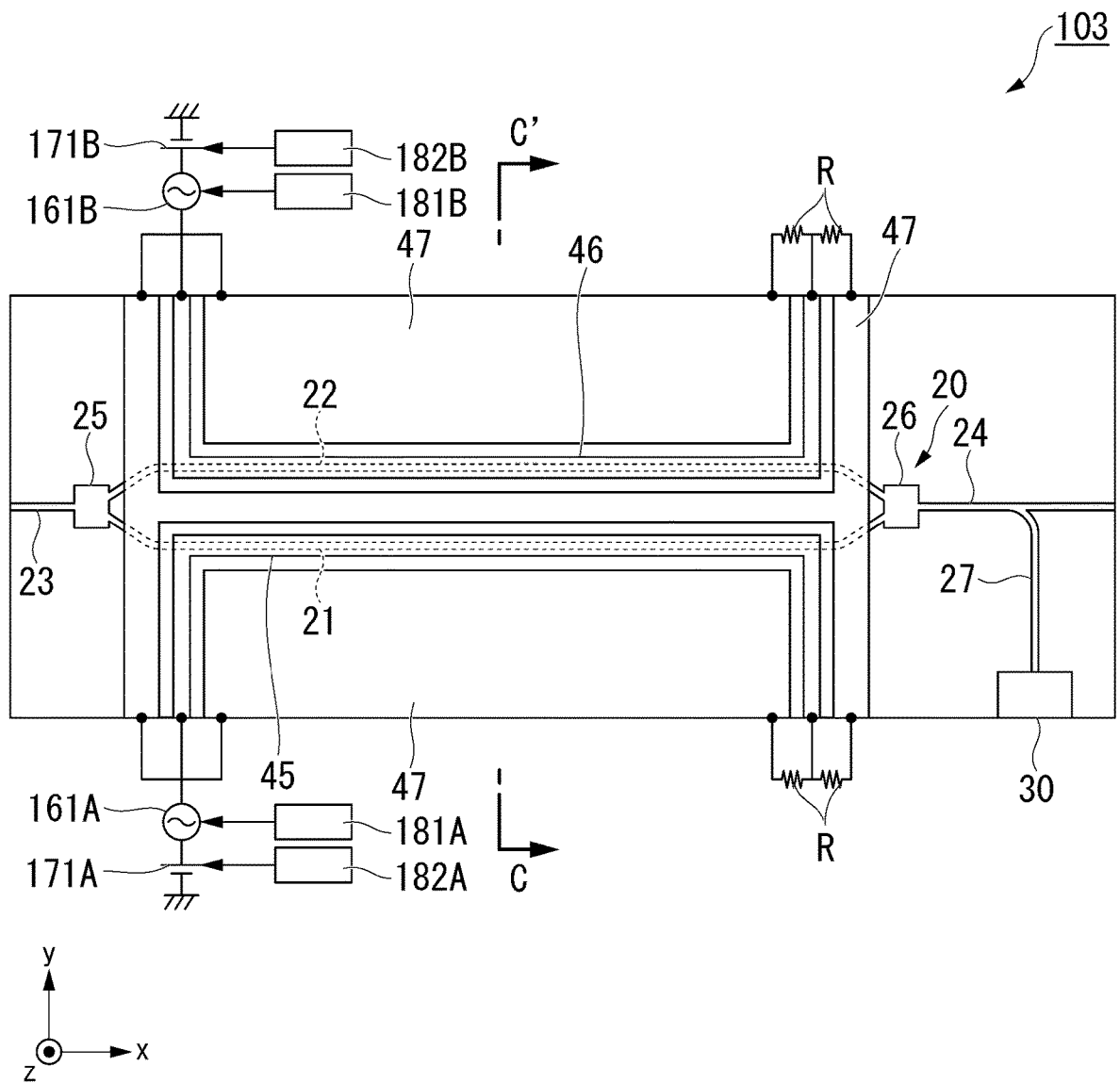
FIG. 19 is a plan view of an optical modulation element according to a third modification example.
Figure 20:
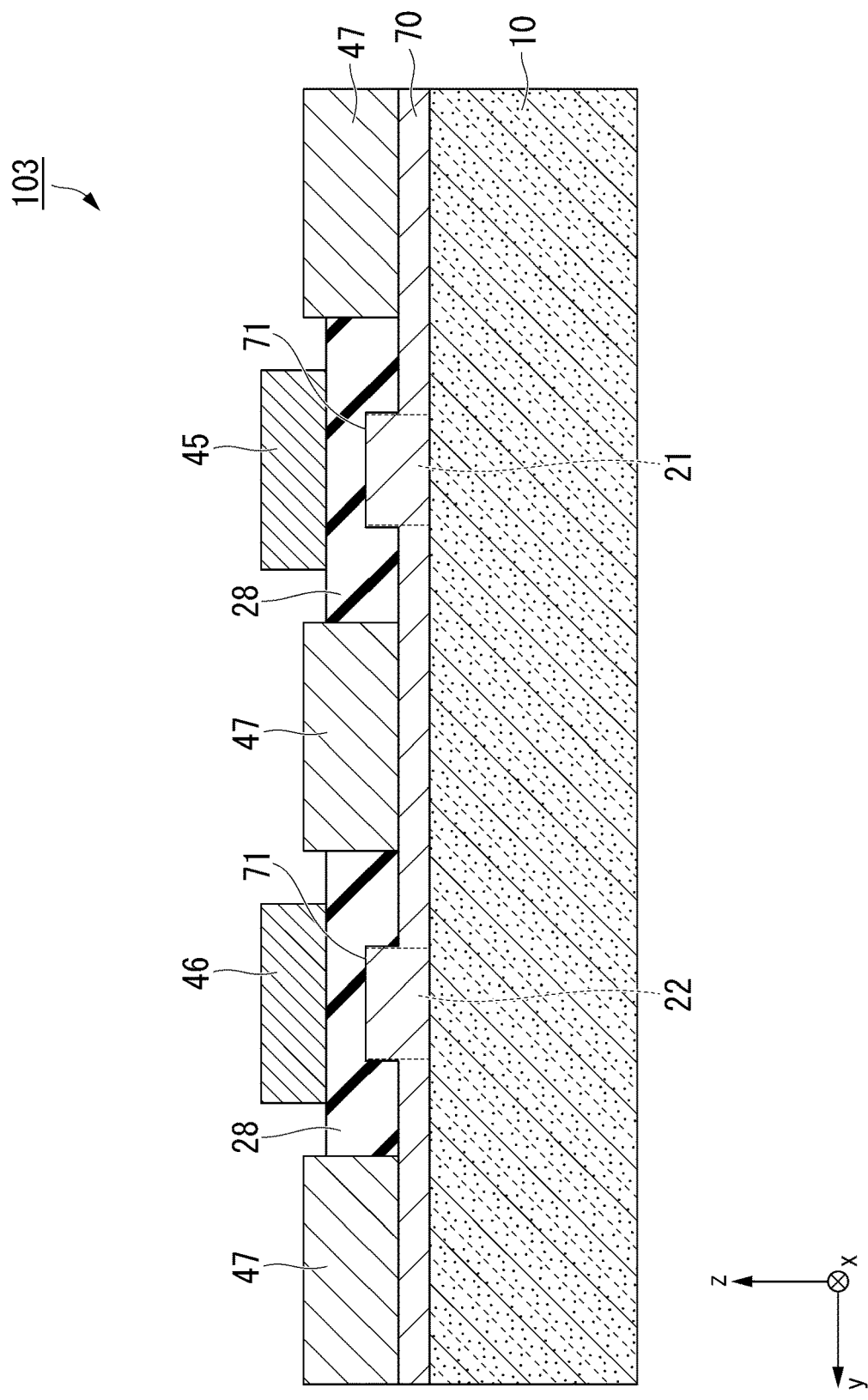
FIG. 20 is a cross-sectional view of the optical modulation element according to the third modification example.

FIG. 19 is a plan view of an optical modulation element 103 according to a third modification example. FIG. 20 is a cross-sectional view of the optical modulation element 103 according to the third modification example. FIG. 20 is a cross section along the line C-C' of FIG. 19. FIG. 19 shows power supplies 161A, 171A, 161B, 171B, control circuits 181A, 181B, 182A, 182B, and a terminating resistor R together. In the third modification example, the same constituent elements as those in the first embodiment and the second embodiment are designated by the same reference signs, and the description thereof will be omitted.

The optical modulation element 103 includes a substrate 10, a waveguide 20, a magnetic element 30, and electrodes 45, 46, and 47. The waveguide 20 and the magnetic element 30 are located on the substrate 10 or above the substrate 10. In the optical modulation element 103, as in the first embodiment or the second embodiment, the monitoring light propagating in the monitoring waveguide 27 is applied to the magnetic element 30. As shown in FIG. 19, the shapes and connection relationships of the electrodes 45, 46, and 47 may be different from those of the electrodes 41, 42, 43, and 44 according to the first to third embodiments.

The waveguide 20 in the optical modulation element 103 includes a part of a slab 70 formed on the substrate 10 and a ridge-shaped portion 71 protruding from the slab 70.

The electrodes 45 and 46 are located at positions where an electric field can be applied to at least a part of the waveguide 20. An electric field can be applied to the first waveguide 21 from the electrode 45. An electric field can be applied to the second waveguide 22 from the electrode 46. The electrode 45 is located above the first waveguide 21, for example. The electrode 46 is located above the second waveguide 22, for example. An electrode 47 is located on the side of the electrodes 45 and 46, for example.

A first end of the electrode 45 is connected to, for example, the power supplies 161A and 171A, and a second end thereof is connected to the terminating resistor R. A first end of the electrode 46 is connected to, for example, the power supplies 161B and 171B, and a second end thereof is connected to the terminating resistor R. The electrode 47 is connected to the reference electric potentials of the power supplies 161A, 171A, 161B, and 171B and the terminating resistor R. The reference electric potential is, for example, ground.

The power supplies 161A and 161B are a part of the drive circuit 160. The power supplies 171A and 171B are a part of the DC bias application circuit 170. The control circuits 181A, 181B, 182A, and 182B are a part of the control circuit 180. In this case, the control circuit 180 shown in FIG. 1 is also connected to the drive circuit 160. Each of the control circuits 181A, 181B, 182A, and 182B can receive an electric signal from the magnetic element 30.

A voltage is applied to the electrode 45 from the power supply 161A and the power supply 171A. The power supply 161A applies a modulation voltage to the electrode 45. The power supply 161A is controlled by the control circuit 181A. The power supply 171A applies a DC bias voltage to the electrode 45. The power supply 171A is controlled by the control circuit 182A. A voltage is applied to the electrode 46 from the power supply 161B and the power supply 171B. The power supply 161B applies a modulation voltage to the electrode 46. The power supply 161B is controlled by the control circuit 181B. The power supply 171B applies a DC bias voltage to the electrode 46. The power supply 171B is controlled by the control circuit 182B. That is, the voltage applied to the electrode 45 and the voltage applied to the electrode 46 can be controlled individually. When a voltage is applied between the electrode 45 and the electrode 47, an electric field is applied to the first waveguide 21, and a refractive index of the first waveguide changes due to an electro-optical effect. When a voltage is applied between the electrode 46 and the electrode 47, an electric field is applied to the second waveguide 22, and a refractive index of the second waveguide changes due to an electro-optical effect.

The optical device detects the state of the output light $L_{out}$ on the basis of the output voltage or output current from the magnetic element 30 (the resistance value of the magnetic element 30 in the lamination direction), that is, the electric signal from the magnetic element 30. The electric signal from the magnetic element 30 is sent to the control circuits 181A, 182A, 181B, and 182B. Each of the control circuits 181A, 182A, 181B, and 182B receives the electric signal from the magnetic element 30 and sends a signal based on the result to the power supply 161A, the power supply 171A, the power supply 161B, or the power supply 171B.

The power supply 161A applies a modulation voltage to the electrode 45 on the basis of the signal from the control circuit 181A. The power supply 161B applies a modulation voltage to the electrode 46 on the basis of the signal from the control circuit 181B. The power supply 171A applies a DC bias voltage to the electrode 45 on the basis of the signal from the control circuit 182A. The power supply 171B applies a DC bias voltage to the electrode 46 on the basis of the signal from the control circuit 182B.

The control circuit 181A and the control circuit 181B adjust the modulation voltages applied to the electrodes 45 and 46 such that a phase difference between the light propagating in the first waveguide 21 and the light propagating in the second waveguide 22 becomes π (180°). The control circuit 182A and the control circuit 182B adjust the DC bias voltages applied to the electrodes 45 and 46 such that a phase difference between the light propagating in the first waveguide 21 and the light propagating in the second waveguide 22 becomes 0 (0°).

In the optical modulation element 103, the output light $L_{out}$ output in a case where the phase difference between the light propagating in the first waveguide 21 and the light propagating in the second waveguide 22 is 0 (0°) becomes the maximum, and the output light $L_{out}$ output in a case where the phase difference between the light propagating in the first waveguide 21 and the light propagating in the second waveguide 22 is π (180°) becomes the minimum.

Under ideal conditions, in a case where no voltage is applied to the electrodes 45 and 46, the phase difference between the light propagating in the first waveguide 21 and the light propagating in the second waveguide 22 becomes 0 (0°). At this time, the output light $L_{out}$ output from the optical modulation element 103 becomes the maximum. The ideal conditions are conditions excluding parameters such as temperature, noise, and DC drift that affect the refractive index of each of the first waveguide 21 and the second waveguide 22.

Further, under the ideal conditions, for example, in a case where a voltage that changes the phase of the light propagating in the first waveguide 21 by +π/2 (+90°) is applied to the electrode 45, and a voltage that changes the phase of the light propagating in the second waveguide 22 by −π/2 (−90°) is applied to the electrode 46, the phase difference between the light propagating in the first waveguide 21 and the light propagating in the second waveguide 22 becomes π (180°). At this time, the output light $L_{out}$ output from the optical modulation element 103 becomes the minimum. A voltage that changes the phase of the light propagating in the first waveguide 21 by −π/2 (−90°) may be applied to the electrode 45, and a voltage that changes the phase of the light propagating in the second waveguide 22 by +π/2 (+90°) may be applied to the electrode 46.

Under actual conditions, due to the influence of temperature, noise, DC drift, and the like, the phase change of the light propagating in the first waveguide 21 and the second waveguide 22 may not be as ideal and may shift.

For example, in a case where no voltage is applied to the electrodes 45 and 46, the phase difference between the light propagating in the first waveguide 21 and the light propagating in the second waveguide 22 may deviate from 0 (0°). Further, for example, in a case where a voltage is applied to the electrodes 45 and 46 such that the phase difference between the light propagating in the first waveguide 21 and the light propagating in the second waveguide 22 becomes π (180°) under the ideal conditions, the phase difference between the light propagating in the first waveguide 21 and the light propagating in the second waveguide 22 may deviate from π (1800).

In a case where the phase difference between the light propagating in the first waveguide 21 and the light propagating in the second waveguide 22 deviates from 0 (0°), the control circuits 182A and 182B control the power supplies 171A and 171B on the basis of the electric signal from the magnetic element 30. As a result, the power supplies 171A and 171B apply a DC bias voltage to at least one of the electrode 45 and the electrode 46 such that the output light $L_{out}$ becomes the maximum.

For example, in a case where the phase of the light propagating in the first waveguide 21 is shifted to a positive side from the phase of the light propagating in the second waveguide 22, a negative voltage is applied to the electrode 45 such that the phase of the light propagating in the first waveguide 21 changes to a negative side, and a positive voltage is applied to the electrode 46 such that the phase of the light propagating in the second waveguide 22 changes to a positive side. On the contrary, for example, in a case where the phase of the light propagating in the first waveguide 21 is shifted to a negative side from the phase of the light propagating in the second waveguide 22, a positive voltage is applied to the electrode 45 such that the phase of the light propagating in the first waveguide 21 changes to a positive side, and a negative voltage is applied to the electrode 46 such that the phase of the light propagating in the second waveguide 22 changes to a negative side.

In a case where the phase difference between the light propagating in the first waveguide 21 and the light propagating in the second waveguide 22 deviates from π (180°), the control circuits 181A and 181B control the power supplies 161A and 161B on the basis of the electric signal from the magnetic element 30. As a result, the power supplies 161A and 161B apply a modulation voltage to at least one of the electrode 45 and the electrode 46 such that the output light $L_{out}$ becomes the minimum.

In this way, the control part 150 having the power supplies 161A, 171A, 161B, and 171B and the control circuits 181A, 181B, 182A, and 182B applies the electric field whose magnitude is adjusted on the basis of the electric signal from the magnetic element 30 to the first waveguide 21 from the electrode 45 and to the second waveguide 22 from the electrode 46.

By the above operation, the optical device according to the third modification example can make the phase difference between the light propagating in the first waveguide 21 and the light propagating in the second waveguide 22 be 0 (0°) or π (180°) and can make the output light $L_{out}$ be the maximum or the minimum under the actual conditions. As a result, the optical device according to the third modification example can utilize a range in which the output light $L_{out}$ becomes the maximum to the minimum. Further, the optical device according to the third modification example can compensate for the influence of temperature, noise, DC drift, and the like under the actual conditions and can improve a signal-to-noise ratio (an S/N ratio).

As described above, in the optical device having the optical modulation element 103 according to the third modification example, the electric field based on the electrical signal from the magnetic element 30 can be applied to at least a part of the waveguide 20 (the first waveguide 21 or the second waveguide 22) from the electrode 45 or the electrode 46. By the feedback operation as described above, the state of the signal (the output light $L_{out}$) output from the optical device having the optical modulation element 103 can be adjusted.

In the third modification example, as in the first embodiment and the second embodiment, a case in which the waveguide 20 has the monitoring waveguide 27 and the monitoring light propagating in the monitoring waveguide 27 is applied to the magnetic element 30 has been exemplified. The third modification example is not limited to this case, and as in the third embodiment, may be configured such that some of the light output from the output terminal of the output waveguide 24 is applied to the magnetic element 30 as the monitoring light.

Fourth Modification Example

Figure 21:
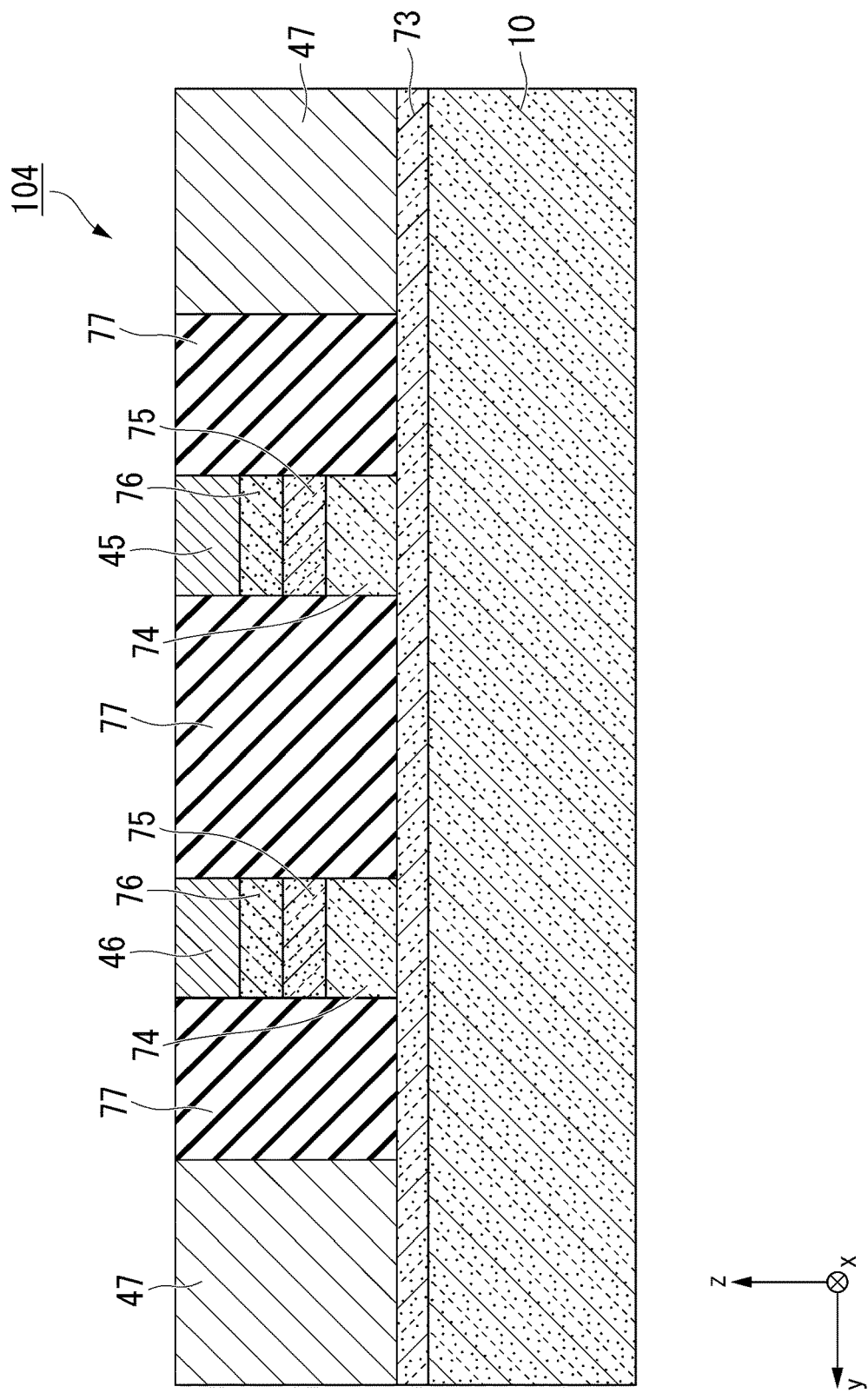
FIG. 21 is a cross-sectional view of an optical modulation element according to a fourth modification example.

FIG. 21 is a cross-sectional view of an optical modulation element 104 according to a fourth modification example. In the fourth modification example, the same constituent elements as those in the third modification example are designated by the same reference signs, and the description thereof will be omitted.

As shown in FIG. 21, the cross-sectional structure of the optical waveguide may be different from the above-mentioned structure. The optical modulation element 104 shown in FIG. 21 is an optical modulation element that utilizes a change in a refractive index in a semiconductor quantum well.

The optical modulation element 104 has a first clad layer 73, a core 75, a second clad layer 76, a dielectric 77, and electrodes 45, 46, and 47. The first clad layer 73 is, for example, an n-type semiconductor and is an n-type InP. The first clad layer 73 has a ridge-shaped portion 74 protruding in the z direction.

The core 75 is located on the ridge-shaped portion 74. The core 75 forms, for example, a semiconductor multiplex quantum well. The core 75 is, for example, a multilayer film of InGaAs and InAlAs or a multilayer film of InGaAsP and InP. The core 75 is the waveguide 20.

The second clad layer 76 is located on the core 75. The second clad layer 76 is, for example, a p-type semiconductor and is a p-type InP. Each of the electrodes 45 and 46 is located on the second clad layer 76. When a voltage is applied to the electrodes 45 and 46, a refractive index of the core 75 having the semiconductor multiplex quantum well changes. The dielectric 77 is, for example, an organic dielectric material, a ceramic dielectric material, or the like. The organic dielectric material is, for example, a benzocyclobutene resin or the like. The ceramic dielectric material is, for example, silicon oxide, aluminum oxide, or the like.

Similar to the third modification example, in the optical modulation element 104 according to the fourth modification example, the electrode 45 or the electrode 46 is located at a position where an electric field can be applied to at least a part of the waveguide 20 (the first waveguide 21 or the second waveguide 22). An electric field can be applied to the first waveguide 21 from the electrode 45. An electric field can be applied to the second waveguide 22 from the electrode 46. The operation of applying the electric field whose magnitude is adjusted on the basis of the electric signal from the magnetic element 30 to the first waveguide 21 from the electrode 45 and to the second waveguide 22 from the electrode 46 is the same as in the third modification example.

The optical modulation element 104 can detect the state of the output light $L_{out}$ on the basis of the output voltage or output current from the magnetic element 30 (the resistance value of the magnetic element 30 in the lamination direction), that is, the electric signal from the magnetic element 30.

Fifth Modification Example

Figure 22:
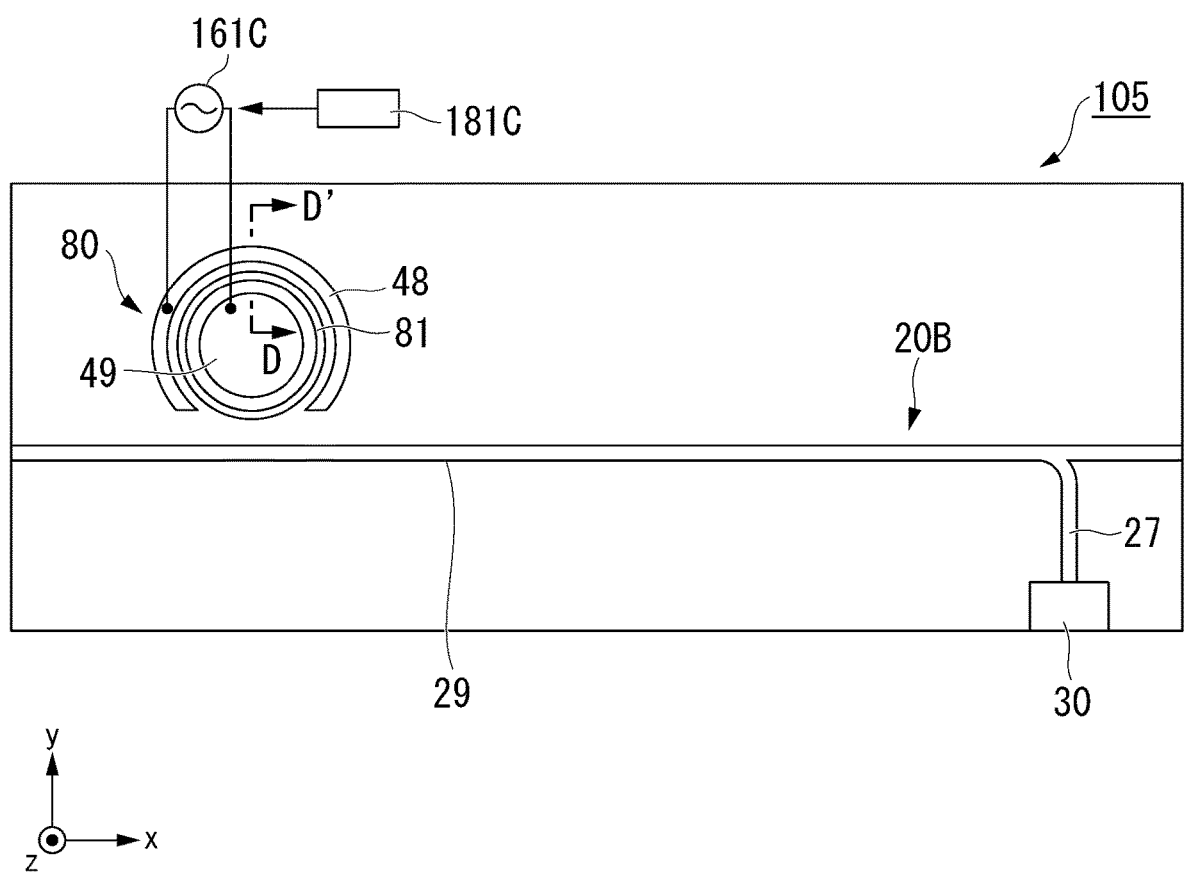
FIG. 22 is a plan view of an optical modulation element according to a fifth modification example.
Figure 23:
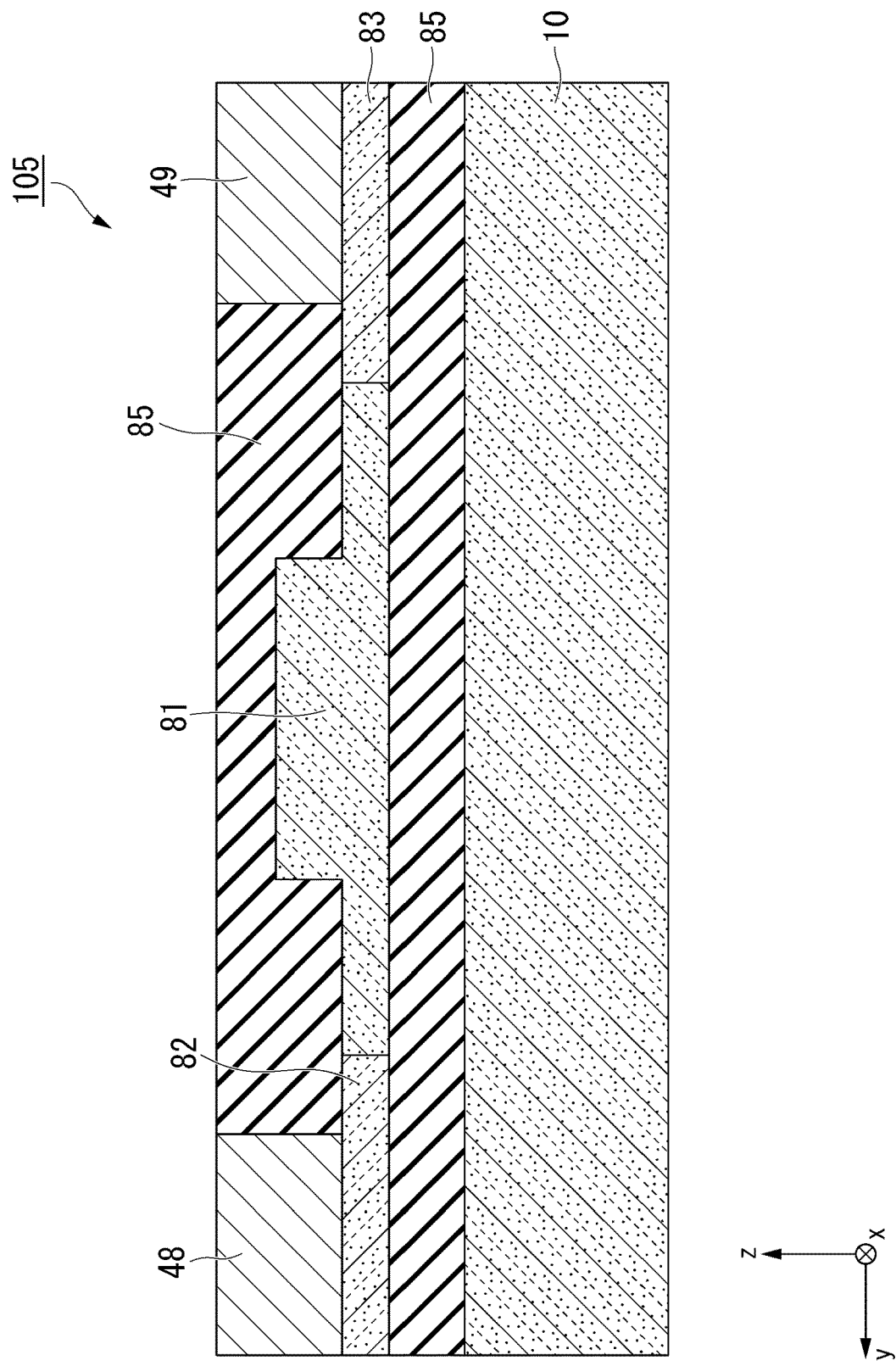
FIG. 23 is a cross-sectional view of the optical modulation element according to the fifth modification example.

FIG. 22 is a plan view of an optical modulation element 105 according to a fifth modification example. FIG. 22 shows a power supply 161C and a control circuit 181C together. FIG. 23 is a cross-sectional view of the optical modulation element 105 according to the fifth modification example. FIG. 23 is a cross section along the line D-D' of FIG. 22. In the fifth modification example, the same constituent elements as those in the first embodiment and the second embodiment are designated by the same reference signs, and the description thereof will be omitted.

The optical modulation element 105 shown in FIG. 22 is a ring modulation element using a ring resonator 80. As shown in FIG. 22, the constituent elements of the optical modulation element may be different from the above-mentioned constituent elements.

The optical modulation element 105 includes a ring resonator 80, a waveguide 20B, and a magnetic element 30. All of the ring resonator 80, the waveguide 20B, and the magnetic element 30 are located on the substrate 10 or above the substrate 10.

The waveguide 20B has a first waveguide 29 and a monitoring waveguide 27. The light input to a first end of the first waveguide 29 is output from a second end of the first waveguide 29. The monitoring waveguide 27 is connected to the first waveguide 29 at a position between a position of the first waveguide 29 corresponding to the ring resonator 80 and the second end. At least some of the light propagating in the first waveguide 29 propagates in the monitoring waveguide 27. As in the first embodiment or the second embodiment, the monitoring light propagating in the monitoring waveguide 27 is applied to the magnetic element 30. The waveguide 20B is, for example, a semiconductor and is, for example, silicon, silicon germanium, indium phosphide, gallium arsenide, or the like. The waveguide 20B is covered with a clad such as $SiO_2$.

The ring resonator 80 has a ring-shaped waveguide 81 and doped regions 82 and 83 located inside and outside the waveguide 81. The waveguide 81 is, for example, a semiconductor and is, for example, silicon, silicon germanium, indium phosphide, gallium arsenide, or the like. The doped regions 82 and 83 are semiconductors doped with a carrier. One of the doped regions 82 and 83 is an n-type semiconductor, and the other is a p-type semiconductor. An electrode 48 is connected to the doped region 82, and an electrode 49 is connected to the doped region 83. The waveguide 81, the doped regions 82 and 83, and the electrodes 48 and 49 are covered with a clad 85 such as $SiO_2$.

The power supply 161C is connected to the electrode 48 and the electrode 49. The power supply 161C is a part of the drive circuit 160. The control circuit 181C is a part of the control circuit 180. In this case, the control circuit 180 shown in FIG. 1 is also connected to the drive circuit 160. The control circuit 181C can receive an electric signal from the magnetic element 30. The control circuit 181C controls the power supply 161C on the basis of the electric signal from the magnetic element 30.

In a case where a frequency of the optical signal propagating in the first waveguide 29 matches a resonance frequency of the ring resonator 80, the ring resonator 80 confines the light of the optical signal having that frequency therein. Therefore, in a case where the frequency of the optical signal propagating in the first waveguide 29 is in the vicinity of this resonance frequency, the absorption of light becomes large and the intensity of the output light becomes small. The resonance frequency of the ring resonator 80 is determined according to an optical path length along a circumference of the waveguide 81. Further, it is possible to change the resonance frequency of the ring resonator 80 by applying a voltage between the electrode 48 and the electrode 49, applying an electric field to the waveguide 81, injecting a carrier into the waveguide 81, and changing a refractive index of the waveguide 81. For example, in the optical modulation element 105, it is possible to increase the intensity of the output light by applying a voltage between the electrode 48 and the electrode 49 and making the resonance frequency of the ring resonator 80 different from the frequency of the optical signal propagating in the first waveguide 29. As described above, in the optical modulation element 105, it is possible to change the intensity of the output light of the optical signal having a specific frequency, and thus it is possible to modulate the light.

The optical device according to the fifth modification example detects the state of the output light $L_{out}$ on the basis of the output voltage or output current from the magnetic element 30 (the resistance value of the magnetic element 30 in the lamination direction), that is, the electric signal from the magnetic element 30. The electric signal from the magnetic element 30 is sent to the control circuit 181C. The control circuit 181C receives the electric signal from the magnetic element 30 and sends a signal based on the result to the power supply 161C.

In the optical modulation element 105, in a case where the resonance frequency of the ring resonator 80 matches the frequency of the optical signal propagating in the first waveguide 29, the output light $L_{out}$ becomes the minimum. In a case of a design in which the resonance frequency of the ring resonator 80 when no voltage is applied to the electrodes 48 and 49 matches the frequency of the optical signal propagating through the first waveguide 29, under the ideal conditions, when no voltage is applied to the electrodes 48 and 49, the output light $L_{out}$ output from the waveguide 20B becomes the minimum.

However, under the actual conditions, due to the influence of temperature, noise, DC drift, and the like, even in a case where no voltage is applied to the electrodes 48 and 49, the output light $L_{out}$ output from the waveguide 20B may not become the minimum.

In a case where the output light $L_{out}$ output from the waveguide 20B does not become the minimum, the control circuit 181C controls the power supply 161C on the basis of the electric signal from the magnetic element 30, and the power supply 161C applies a voltage between the electrode 48 and the electrode 49 such that the output light $L_{out}$ becomes the minimum.

In this way, the control part 150 having the power supply 161C and the control circuit 181C applies the electric field whose magnitude is adjusted on the basis of the electric signal from the magnetic element 30 to the waveguide 81 from the electrode 48 and the electrode 49.

With the above operation, the optical device according to the fifth modification example can minimize the output light $L_{out}$ under actual conditions. As a result, the optical device according to the fifth modification example can increase a change width of the output light $L_{out}$ in the modulation of the output light $L_{out}$. Further, the optical device according to the fifth modification example can compensate for the influence of temperature, noise, DC drift, and the like under the actual conditions and can improve a signal-to-noise ratio (an S/N ratio).

As described above, in the optical device having the optical modulation element 105 according to the fifth modification example, the electric field based on the electrical signal from the magnetic element 30 can be applied to at least a part of the waveguide 81 from the electrode 48 and the electrode 49. By the feedback operation as described above, the state of the signal (the output light $L_{out}$) output from the optical device having the optical modulation element 105 can be adjusted.

In the fifth modification example, as in the first embodiment and the second embodiment, a case in which the waveguide 20B has the monitoring waveguide 27 and the monitoring light propagating in the monitoring waveguide 27 is applied to the magnetic element 30 has been exemplified. The fifth modification example is not limited to this case, and as in the third embodiment, may be configured such that some of the light output from the output terminal of the first waveguide 29 is applied to the magnetic element 30 as the monitoring light.

Sixth Modification Example

Figure 24:
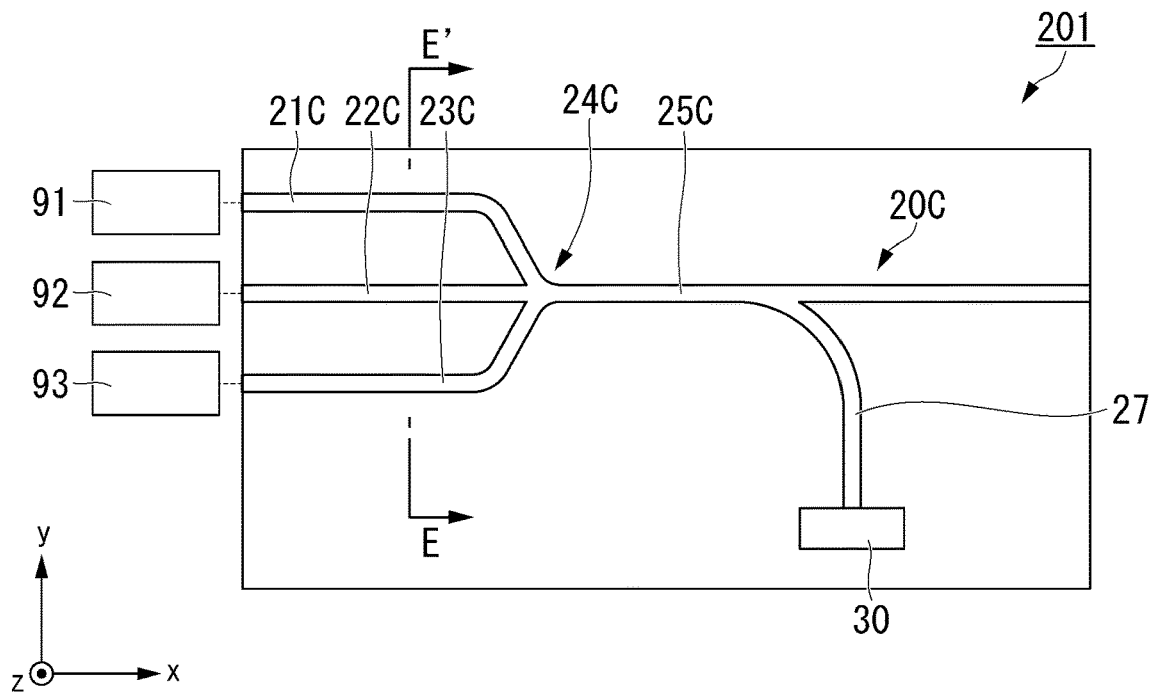
FIG. 24 is a plan view of an optical device according to a sixth modification example.

FIG. 24 is a plan view of an optical device 201 according to a sixth modification example. In the sixth modification example, the same constituent elements as those in the first embodiment and the second embodiment are designated by the same reference signs, and the description thereof will be omitted.

The optical device 201 has a plurality of laser diodes 91, 92, and 93, a waveguide 20C, and a magnetic element 30. The optical device 201 is a planar lightwave circuit used in augmented reality (AR) glasses or a small projector. As in the optical device 201 shown in the sixth modification example, the optical device is not limited to the optical modulator.

Each of the laser diodes 91, 92, and 93 outputs laser light. The laser diodes 91, 92, and 93 are, for example, lasers having three colors of red, green, and blue. The number of the laser diodes, the wavelength range to be output therefrom, and the like are not limited to this case.

Figure 25:
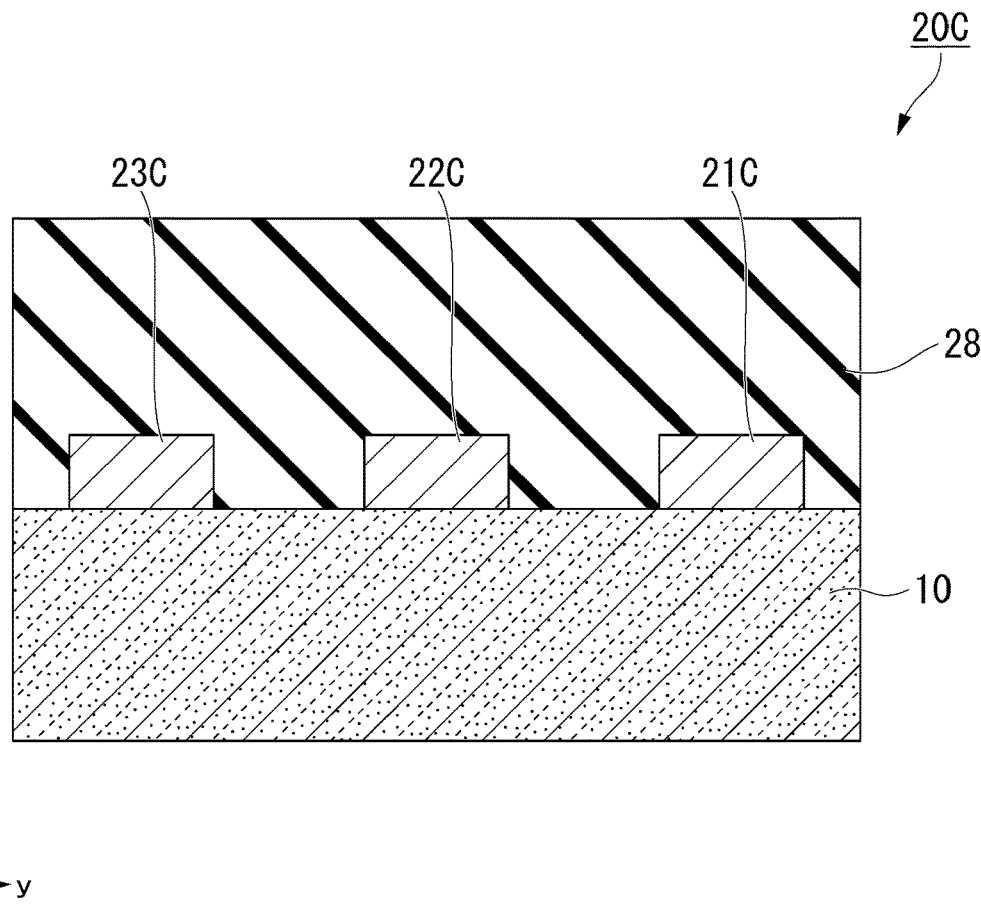
FIG. 25 is a cross-sectional view of an optical modulation element according to the sixth modification example.

The waveguide 20C has, for example, input waveguides 21C, 22C, and 23C, a combined waveguide 24C, an output waveguide 25C, and a monitoring waveguide 27. FIG. 25 is a cross-sectional view of the waveguide 20C of the optical device 201 according to the sixth modification example and is a cross section along E-E' in FIG. 24. The input waveguides 21C, 22C, and 23C are located on the substrate 10 and are covered with, for example, a clad 28. The waveguide 20C and the magnetic element 30 are located on the same substrate or above the same substrate. The magnetic element 30 is located at a position where the monitoring light is applied. As in the first embodiment or the second embodiment, the monitoring light propagating in the monitoring waveguide 27 is applied to the magnetic element 30.

The light emitted from each of the laser diodes 91, 92, and 93 is input to each of the input waveguides 21C, 22C, and 23C. The light propagating in each of the input waveguides 21C, 22C, and 23C merges at the combined waveguide 24C. The light merged in the combined waveguide 24C propagates in the output waveguide 25C. The light merged at the combined waveguide 24C is output from one end of the output waveguide 25C.

At least some of the light propagating in the output waveguide 25C branches into the monitoring waveguide 27.

The branched light propagates in the monitoring waveguide 27 as the monitoring light and is applied to the magnetic element 30.

The output voltage or output current from the magnetic element 30 (the resistance value of the magnetic element 30 in the lamination direction) changes according to the intensity of the monitoring light applied to the first ferromagnetic layer 31. The optical device 201 can read out the intensity of the monitoring light on the basis of the output voltage or output current from the magnetic element 30 (the resistance value of the magnetic element 30), that is, the electric signal from the magnetic element 30.

The optical device 201 can measure the intensity of the light output from each of the laser diodes 91, 92, and 93 on the basis of the output voltage or output current from the magnetic element 30 (the resistance value of the magnetic element 30 in the lamination direction), that is, the electric signal from the magnetic element 30.

The light output from one end of the output waveguide 25C is a combination of the light output from each of the laser diodes 91, 92, and 93. By adjusting the intensity of the light output from each of the laser diodes 91, 92, and 93, the optical device 201 can adjust the white balance of the output light. The intensity of the light output from each of the laser diodes 91, 92, and 93 can be adjusted by feeding back the measurement result of the output from the magnetic element 30 to each of the laser diodes 11, 12, and 13.

In the sixth modification example, as in the first embodiment and the second embodiment, a case in which the waveguide 20C has the monitoring waveguide 27 and the monitoring light propagating in the monitoring waveguide 27 is applied to the magnetic element 30 has been exemplified. The sixth modification example is not limited to this case, and as in the third embodiment, may be configured such that some of the light output from the output terminal of the output waveguide 25C is applied to the magnetic element 30 as the monitoring light.

Seventh Modification Example

Figure 26:
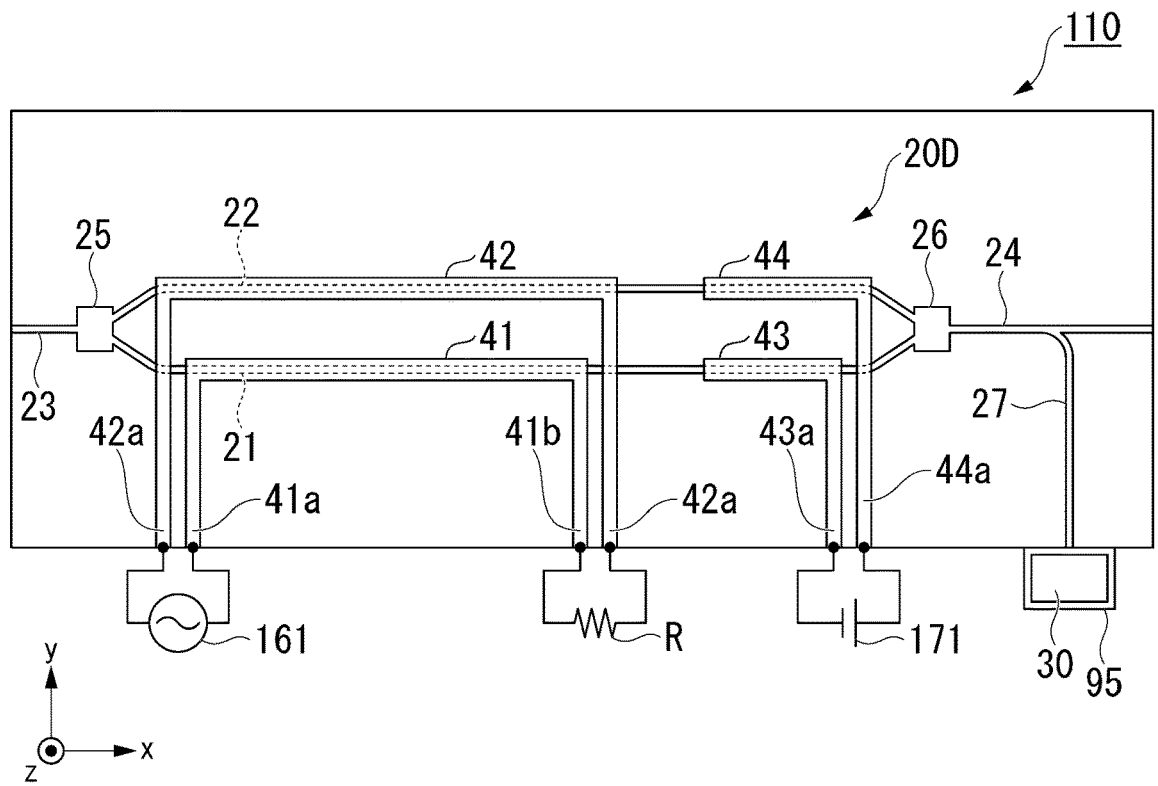
FIG. 26 is a plan view of an optical modulation element according to a seventh modification example.
Figure 27:
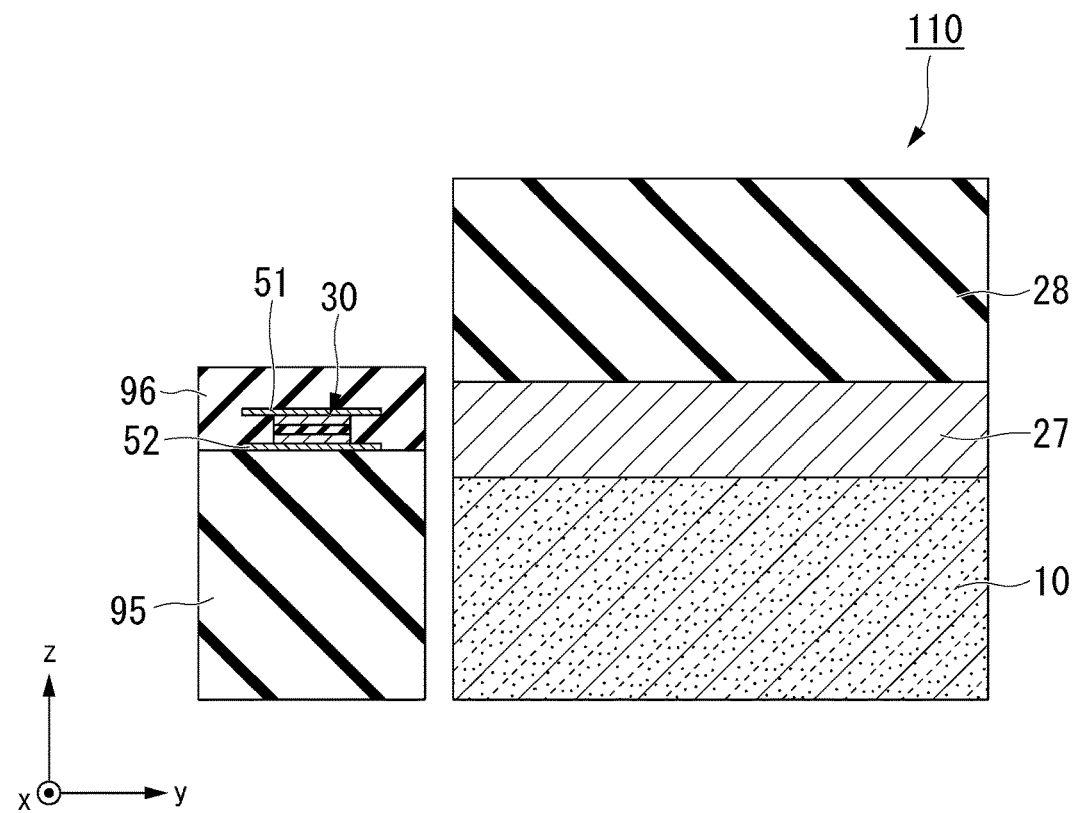
FIG. 27 is a cross-sectional view of the vicinity of a magnetic element of the optical modulation element according to the seventh modification example.

FIG. 26 is a plan view of an optical modulation element 110 according to a seventh modification example. FIG. 27 is a cross-sectional view of the vicinity of a magnetic element 30 of the optical modulation element 110 according to the seventh modification example. In the seventh modification example, the same constituent elements as those in the first embodiment are designated by the same reference signs, and the description thereof will be omitted.

The optical modulation element 110 has a support 95 that supports the magnetic element 30. The support 95 is a member different from the substrate 10 on which a waveguide 20D is formed. The support 95 and the substrate 10 are fixed on a common support, for example. The magnetic element 30 is located on or above the support 95. So far, an example in which the waveguide 20 and the magnetic element 30 are formed on the same substrate or above the same substrate has been shown, but in the seventh modification example, the waveguide 20D and the magnetic element 30 are formed on different members.

The support 95 is made of the same material as the substrate 10, for example. The magnetic element 30 is located in an insulating layer 96 formed on the support 95. The insulating layer 96 is made of the same material as the side wall insulating layer 39, for example.

In the example shown in FIG. 27, the height position of the magnetic element 30 in the z direction is aligned with the height position of the output terminal of the monitoring waveguide 27 in the z direction.

Figure 28:
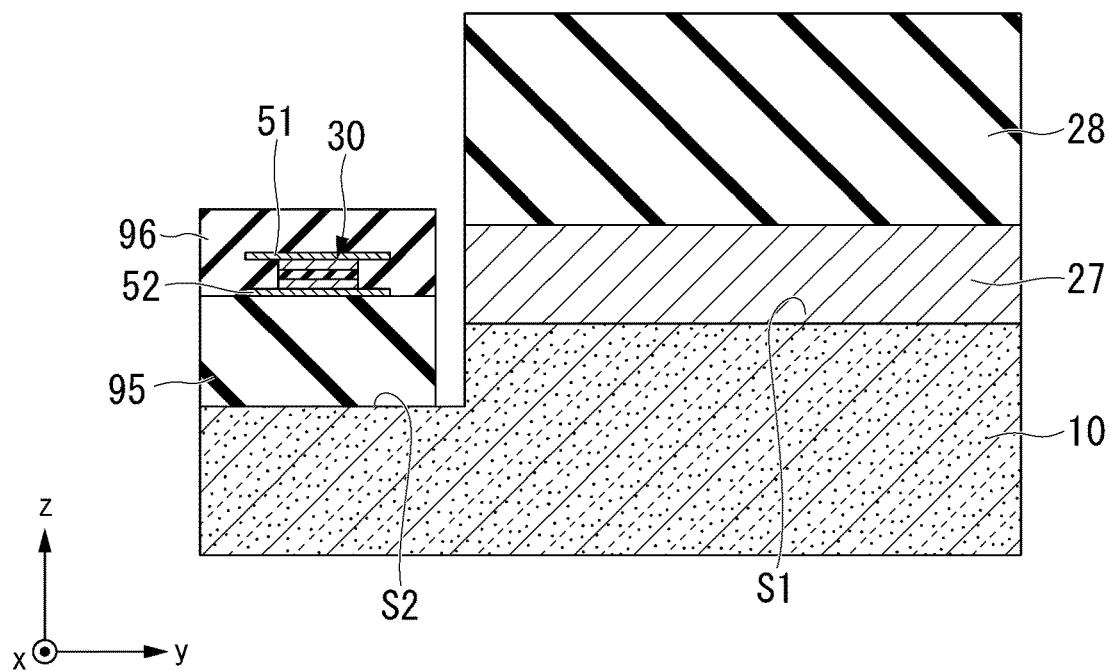
FIG. 28 is a cross-sectional view of the vicinity of a magnetic element of an optical modulation element according to another example of the seventh modification example.

Further, as shown in FIG. 28, the support 95 may be located on the substrate 10. The magnetic element 30 is located above an upper surface S2 of the substrate 10 and on the support 95. The waveguide 20 (the monitoring waveguide 27) is located on an upper surface S1 of the substrate 10.

Figure 29:
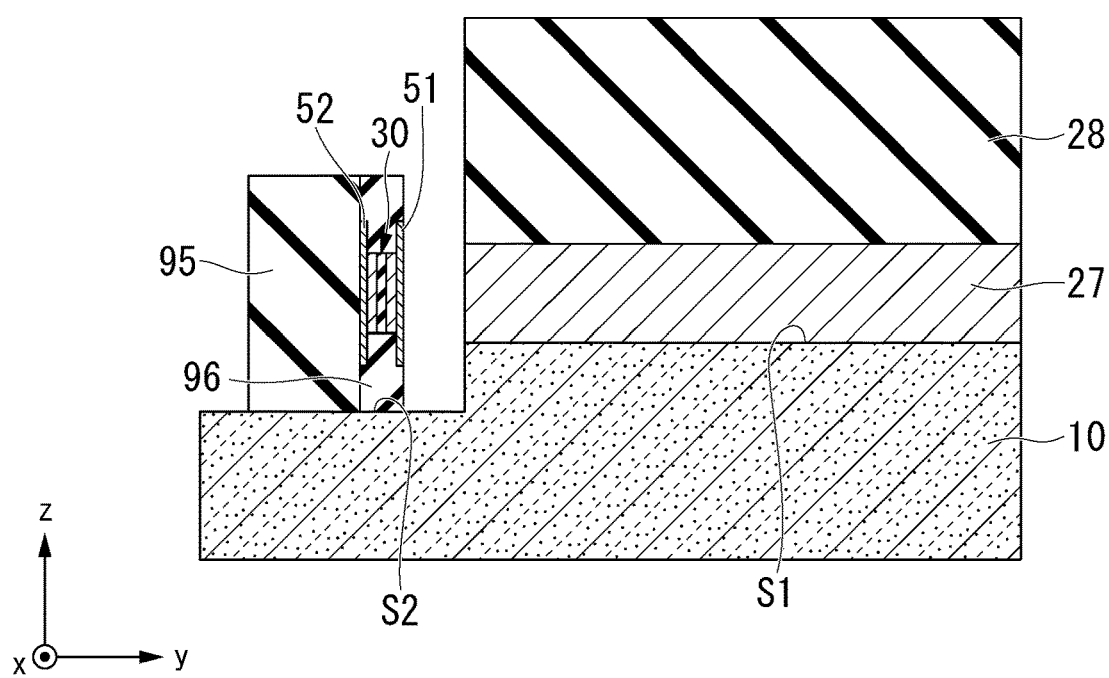
FIG. 29 is a cross-sectional view of the vicinity of a magnetic element of an optical modulation element according to another example of the seventh modification example.

Further, as shown in FIG. 29, the traveling direction of the monitoring light from the output terminal of the monitoring waveguide 27 may match the lamination direction of the magnetic element 30. The support 95 is installed such that when stacking is performed for the magnetic element 30, a side surface of the support 95 faces the upper surface S2 of the substrate 10, for example. The monitoring light is applied to, for example, the magnetic element 30 from the lamination direction of the magnetic element 30. In this case, the electrode 51 has transparency in the wavelength range of the light applied to the magnetic element 30. When the electrode 51 transmits some of the monitoring light, the magnetic element 30 is irradiated with the monitoring light.

Figure 30:
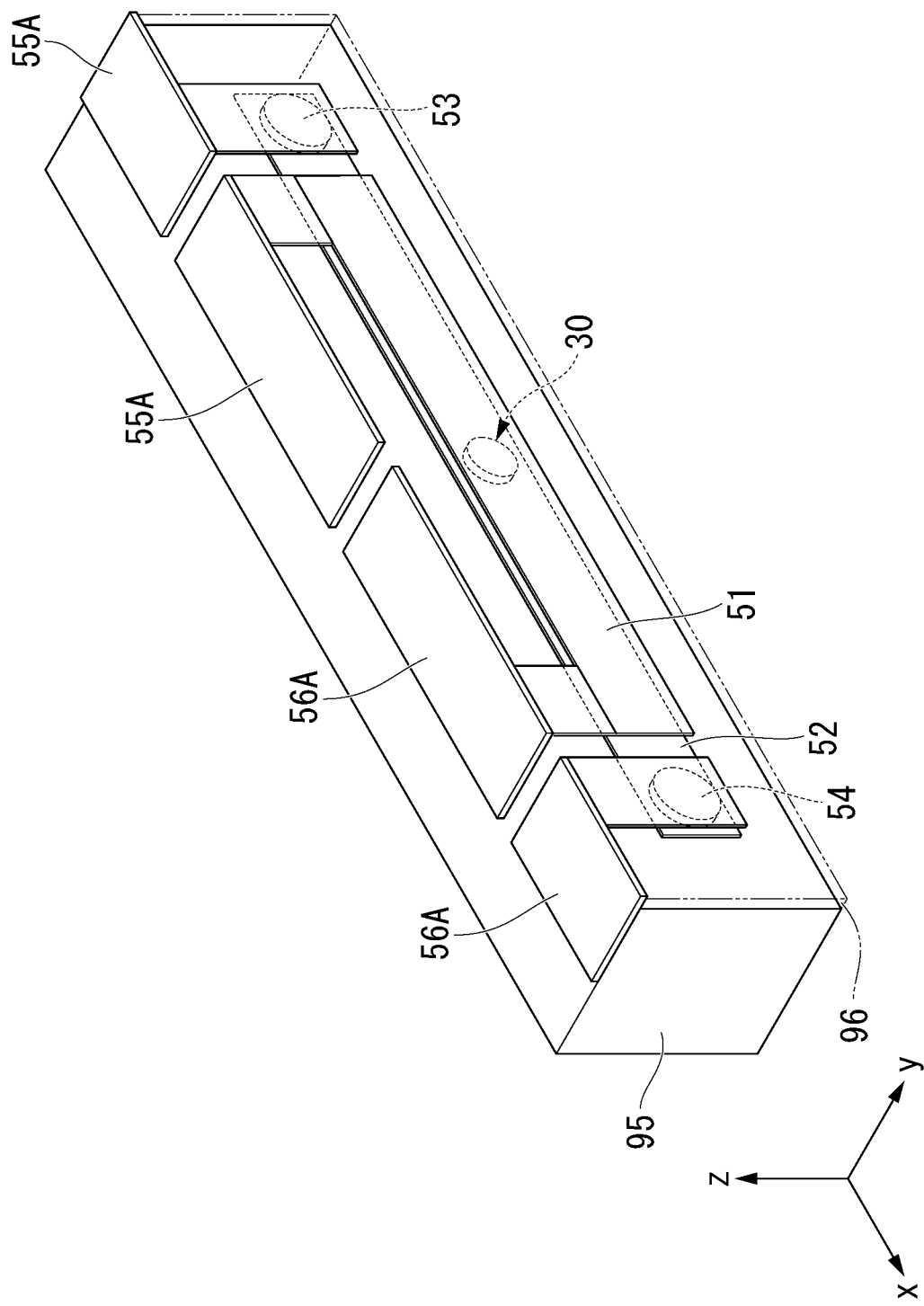
FIG. 30 is a perspective view of the vicinity of a magnetic element of an optical modulation element according to another example of the seventh modification example.

As shown in FIG. 30, the electrode 51 is connected to an input terminal 55A and an output terminal 56A. The electrode 52 is connected to the input terminal 55A via the via wiring 53 and to the output terminal 56A via the via wiring 54. The input terminal 55A and the output terminal 56A are formed on the side surface of the support 95.

Even in a case where the waveguide 20 and the magnetic element 30 are formed on different members, the optical modulation element 110 can monitor at least some of the light propagating in the waveguide 20D using the magnetic element 30.

Eighth Modification Example

Figure 31:
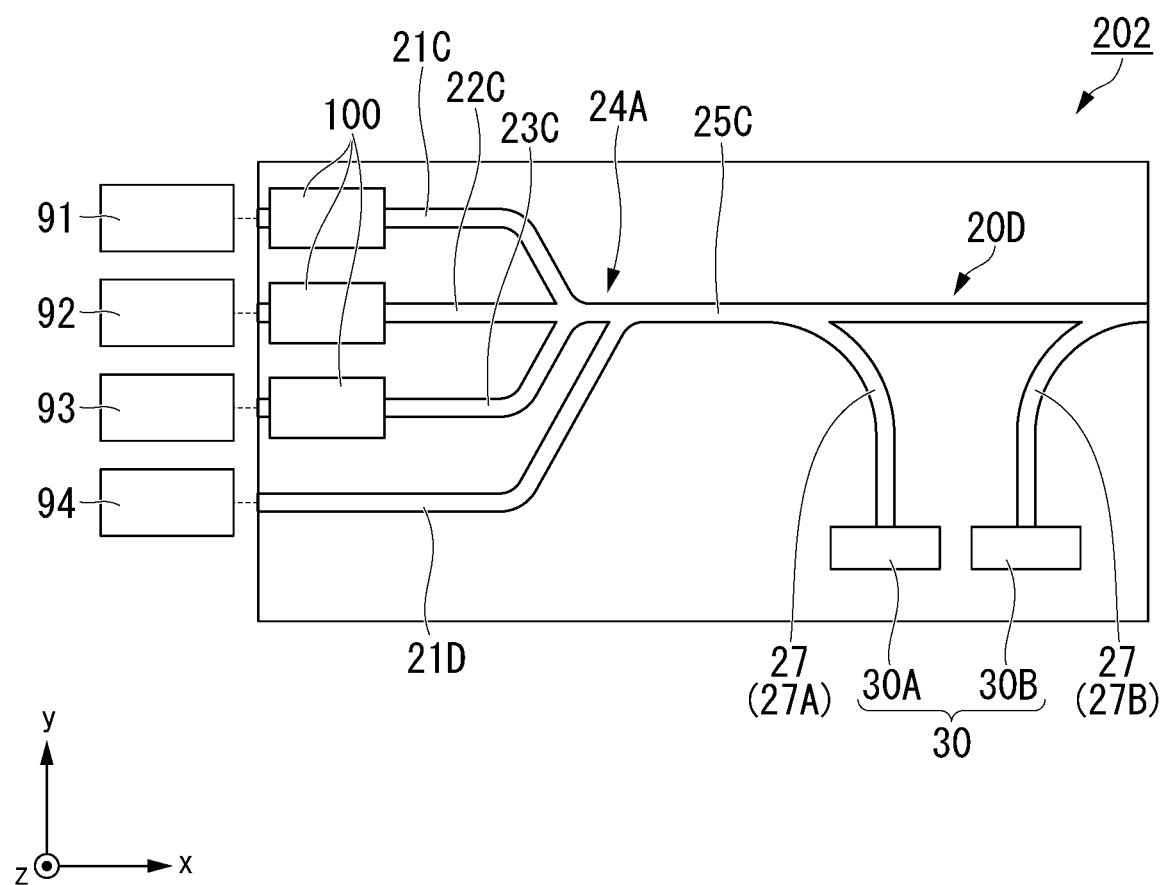
FIG. 31 is a plan view of an optical device according to an eighth modification example.

FIG. 31 is a plan view of an optical device 202 according to an eighth modification example. In FIG. 31, the same constituent elements as those of the optical device 201 shown in FIG. 24 are designated by the same reference signs, and the description thereof will be omitted.

The optical device 202 has laser diodes 91, 92, 93, and 94, a waveguide 20D, magnetic elements 30, and optical modulation elements 100.

The laser diode 94 outputs laser light. The laser diode 94 is optically connected to the waveguide 20D. For example, the laser diode 94 is a near-infrared laser that outputs light (near-infrared light) in a wavelength range of 780 nm or more and 2500 nm or less.

The shape of the waveguide 20D of the optical device 202 is different from that of the waveguide 20C of the optical device 201. The cross-sectional structure of the waveguide 20D is the same as the cross-sectional structure of the waveguide 20C. The waveguide 20D has, input waveguides 21C, 22C, 23C, and 21D, a combined waveguide 24D, an output waveguide 25C, and monitoring waveguides 27A and 27B.

The input waveguide 21D is optically connected to the laser diode 94. For example, the light output from the laser diode 94 propagates in the input waveguide 21D. The combined waveguide 24D is located between the input waveguides 21C, 22C, 23C, and 21D and the output waveguide 25C. The light propagating in each of the input waveguides 21C, 22C, 23C, and 21D merges at the combined waveguide 24D. The output waveguide 25C is connected to the combined waveguide 24D. The output waveguide 25C is connected to the input waveguides 21C, 22C, 23C, and 21D via the combined waveguide 24D, and the light from the input waveguides 21C, 22C, 23C, and 21D propagates in the output waveguide 25C.

Each of the monitoring waveguides 27A and 27B is connected to the output waveguide 25C. A plurality of monitoring waveguides 27A may be provided, and the monitoring waveguides 27A may be connected to the respective input waveguides 21C, 22C, 23C, and 21D. At least some of the light propagating in at least one of the input waveguides 21C, 22C, 23C, and 21D and the output waveguide 25C propagates in the monitoring waveguide 27A. At least some of the light propagating in the output waveguide 25C propagates in the monitoring waveguide 27B.

At a connecting portion between a first monitoring waveguide 27A and the output waveguide 25C, an angle formed by the first monitoring waveguide 27A with respect to the +x direction is, for example, smaller than 90°. At a connecting portion between a second monitoring waveguide 27B and the output waveguide 25C, an angle formed by the second monitoring waveguide 27B with respect to the +x direction is, for example, larger than 90°. The +x direction is, for example, a direction in which the light output from the laser diodes 91, 92, 93, and 94 is directed toward the output terminal of the output waveguide 25C in the output waveguide 25C.

The monitoring light propagates in each of the first monitoring waveguide 27A and the second monitoring waveguide 27B. At least some of the light output from the laser diodes 91, 92, 93, and 94 and propagating in at least one of the input waveguides 21C, 22C, 23C, and 21D and the output waveguide 25C in a direction from the laser diodes 91, 92, 93, and 94 toward the input waveguides 21C, 22C, 23C, and 21D or the output waveguide 25C propagates in the first monitoring waveguide 27A. At least some of the light output to the outside from the output waveguide 25C and reflected by the object to be irradiated propagates in the second monitoring waveguide 27B. Hereinafter, in the monitoring light, at least some of the light output from the laser diodes 91, 92, 93, and 94 and propagating in at least one of the input waveguides 21C, 22C, 23C, and 21D and the output waveguide 25C in a direction from the laser diodes 91, 92, 93, and 94 toward the input waveguides 21C, 22C, 23C, and 21D or the output waveguide 25C may be referred to as a first monitoring light, and at least some of the light output to the outside from the output waveguide 25C and reflected by the object to be irradiated may be referred to as a second monitoring light.

Each of the magnetic elements 30 is the above-mentioned magnetic element 30. One of the magnetic elements 30 is referred to as a first magnetic element 30A, and the other one is referred to as a second magnetic element 30B. The first magnetic element 30A is located at a position where the first monitoring light is applied. The first magnetic element 30A is located at the end of the output terminal of the first monitoring waveguide 27A. The second magnetic element 30B is located at a position where the second monitoring light is applied. The second magnetic element 30B is located at the end of the output terminal of the second monitoring waveguide 27B. The first magnetic element 30A is irradiated with the first monitoring light, and the second magnetic element 30B is irradiated with the second monitoring light.

The optical modulation element 100 is optically connected to, for example, each of the input waveguides 21C, 22C, and 23C. The optical modulation element 100 is, for example, the optical modulation element shown in FIG. 2. The optical modulation element 100 can also be replaced with each of other optical modulation elements. Further, the magnetic element 30 and the monitoring waveguide 27 may be removed from the optical modulation element 100.

The optical modulation element 100 can adjust the intensity of each light reaching the combined waveguide 24D while keeping the outputs of the laser diodes 91, 92, and 93 constant. The configuration in which the intensity of the light is adjusted using the optical modulation element 100 can suppress the power consumption as compared with the configuration in which the outputs of the laser diodes 91, 92, and 93 are directly adjusted.

The optical device 202 can measure a state change of the object to be irradiated by measuring the intensity of the reflected light from the object to be irradiated using the second magnetic element 30B.

Figure 32:
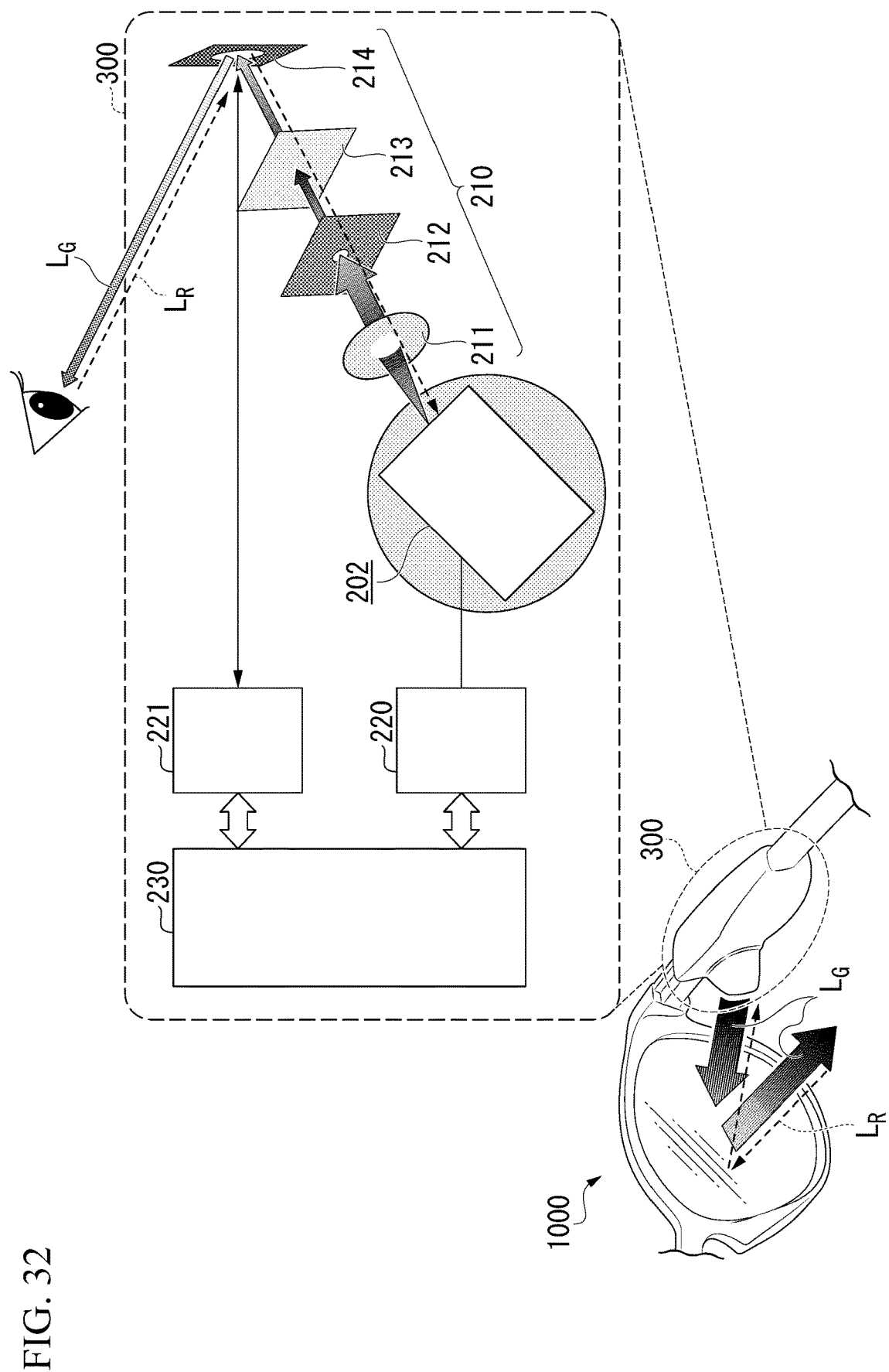
FIG. 32 is a conceptual view of an optical system using an optical device.

FIG. 32 is a conceptual view of an optical system 300 using an optical device 202. The optical system 300 can be mounted on, for example, glasses 1000.

The optical system 300 includes an optical device 202, optics system 210, drivers 220 and 221, and a controller 230. The optics system 210 includes, for example, a collimator lens 211, a slit 212, an ND filter 213, and an optical scanning mirror 214. The optics system 210 guides the light output from the optical device 202 to the object to be irradiated (the eye in this example). The optical scanning mirror 214 is, for example, a biaxial MEMS mirror that changes a reflection direction of the laser light in a horizontal direction and a vertical direction. The optics system 210 is an example and is not limited to this example. The driver 220 controls the output of each of the laser diodes 91, 92, 93, and 94. The driver 221 is a control system for moving the optical scanning mirror 214. The controller 230 controls the drivers 220 and 221.

Light $L_G$ output from the laser diodes 91, 92, 93, and 94 of the optical device 202 propagates through the optical system 210, is reflected by a lens of the glasses 1000, and is incident on the eyes. Here, an example in which light is reflected by the lens of the glasses 1000 is illustrated, but the eyes may be directly irradiated with the light.

The red, green, and blue light $L_G$ emitted from the laser diodes 91, 92, and 93 displays an image. The image can be freely controlled by adjusting the output intensity of each of the laser diodes 91, 92, and 93 with the optical modulation element 100. The output intensity of each of the laser diodes 91, 92, and 93 can be adjusted on the basis of the measurement result of the output from the first magnetic element 30A irradiated with visible light output from each of the laser diodes 91, 92, and 93. The outputs of the laser diodes 91, 92, and 93 may be adjusted directly without using the optical modulation element 100.

Near-infrared light emitted from the laser diode 94 of the optical device 202 is reflected by the pupil of the eye. The reflected light $L_R$ reflected by the pupil of the eye passes through the same optical axis as the light $L_G$ and reaches the optical device 202. In the optical device 202, at least some of the reflected light $L_R$ which is near infrared light propagates in the second monitoring waveguide 27B from the output terminal of the output waveguide 25C and is applied to the second magnetic element 30B. The second magnetic element 30B measures the intensity of the reflected light $L_R$. The optical system 300 can specify the movement of a line-of-sight location (a gaze point) from an application position of the near-infrared light and the intensity of the reflected light $L_R$ adjusted by the optical scanning mirror 214. The reflected light $L_R$ is not limited to the light reflected by the pupil of the eye and may be the light reflected by the cornea of the eye or the light reflected by the sclera of the eye.

Here, as an example of the optical system, a system capable of performing both image display and eye tracking has been illustrated, but the present disclosure is not limited to this example.

For example, the laser diode 94 for eye tracking may be removed from the above optical system. In this case, the optical system is a system for displaying images. In this case, the laser diode 94, the input waveguide 21D, the second monitoring waveguide 27B, and the second magnetic element 30B can be removed from the optical device 202.

Ninth Modification Example

Figure 33:
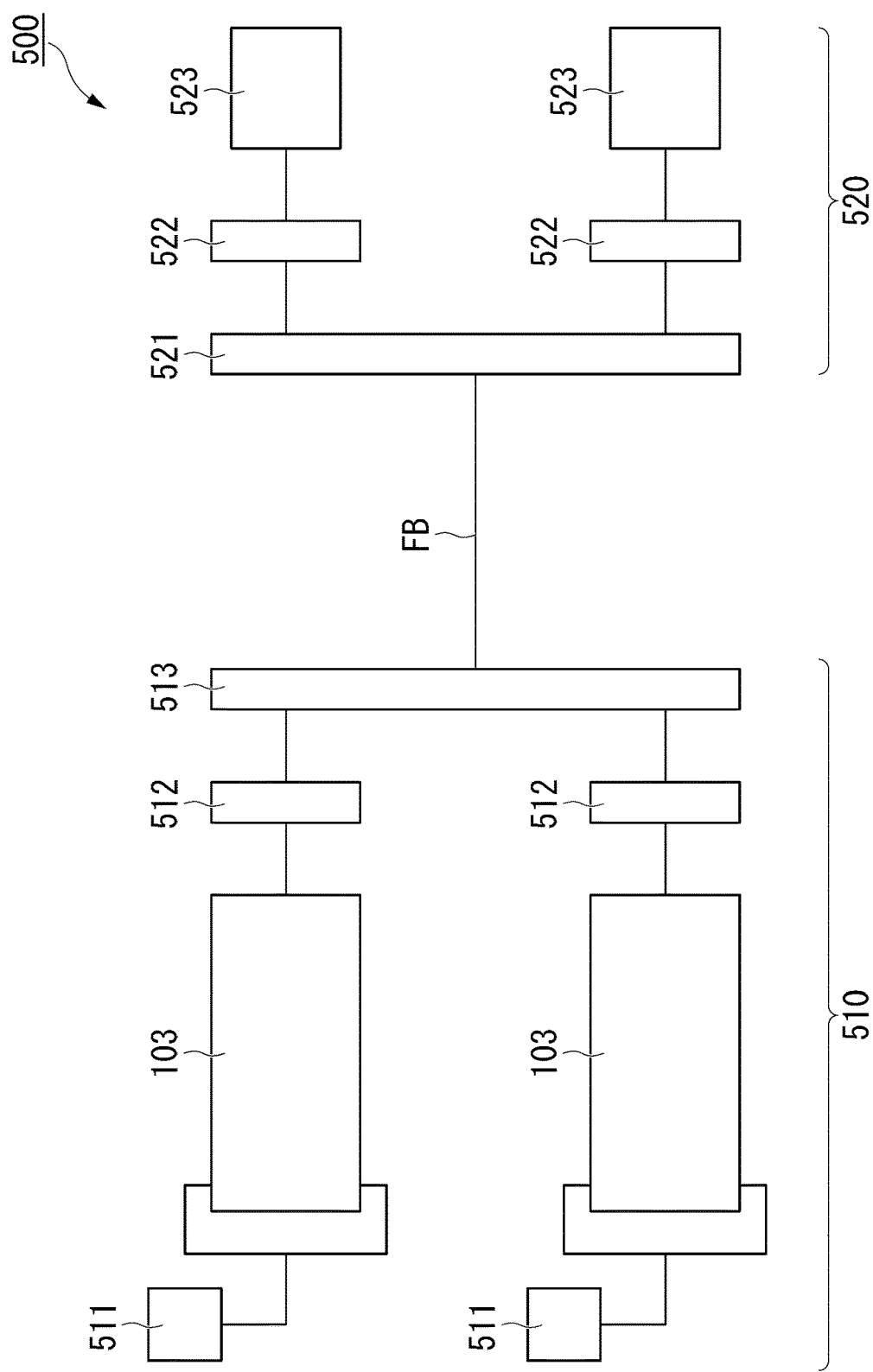
FIG. 33 is a conceptual view of an optical system according to a ninth modification example.

FIG. 33 is a conceptual view of an optical system 500 according to a ninth modification example. The optical system 500 has a transmitting side device 510 and a receiving side device 520. The transmitting side device 510 and the receiving side device 520 are connected through, for example, an optical fiber FB and transmits and receives a signal via the optical fiber FB. The optical system 500 is, for example, an optical communication system.

The transmitting side device 510 includes a plurality of drivers 511, a plurality of optical modulation elements 103, a plurality of filters 512, and a combiner 513. Two units each including the driver 511, the optical modulation element 103, and the filter 512 are connected to the combiner 513, for example.

The optical modulation element 103 is an example, and the optical modulation element 103 may be replaced with each of other optical modulation elements 100 to 102, 104, 105, and 110. The driver 511 is connected to, for example, the power supplies 161A and 161B of the optical modulation element 103 and changes the potentials of the electrodes 45, 46 and 47. Each of the filters 512 is, for example, a bandpass filter and a band-elimination filter. The frequency bands of the optical signals that can pass through the filters 512 are different. The combiner 513 combines the light that has passed through each of the filters 512. The combined light propagates to the receiving side device 520 via the optical fiber FB.

The receiving side device 520 has a splitter 521, a plurality of filters 522, and a plurality of receivers 523. Two units each including the filter 522 and the receiver 523 are connected to the splitter 521, for example.

The splitter 521 separates the optical signal propagated via the optical fiber FB for each frequency band. The splitter 521 separates the optical signal for each frequency band that has passed through each of the filters 512, for example. The optical signal separated by the splitter 521 is demodulated by each of the receivers 523 via the filter 522. As the filter 522, the same filter as the filter 512 can be used.

The optical system 500 according to the ninth modification example is a frequency multiplex type optical communication system and can transmit a large amount of information at one time.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical device comprising:
at least one magnetic element including a first ferromagnetic layer, a second ferromagnetic layer, and a spacer layer sandwiched between the first ferromagnetic layer and the second ferromagnetic layer;
a control circuit;
a substrate; and
a waveguide,
wherein the waveguide and the magnetic element are located on or above the substrate,
at least some of light propagating in the waveguide is applied to the magnetic element, and
the magnetic element is a magnetic tunnel junction element,
the magnetic tunnel junction element outputs a voltage or a current in accordance with an intensity of the light applied thereto, and
the control circuit receives an electric signal from the magnetic tunnel junction element, and outputs an output signal to another circuit, based on the electric signal.

2. The optical device according to claim 1, further comprising:
an electrode,
wherein an electric field based on an electric signal from the magnetic element is capable of being applied from the electrode to at least a part of the waveguide.

3. The optical device according to claim 1, further comprising:
a reflector,
wherein the reflector reflects at least some of the light toward the magnetic element.

4. The optical device according to claim 1, wherein at least some of the light is applied to the magnetic element from a direction intersecting a lamination direction of the magnetic element.

5. The optical device according to claim 1, wherein at least some of the light is applied to the magnetic element from a lamination direction of the magnetic element.

6. The optical device according to claim 1, wherein the waveguide further includes a monitoring waveguide, and wherein at least some of the light propagates in the monitoring waveguide.

7. The optical device according to claim 1, further comprising:
a laser diode and an optical modulation element,
wherein the laser diode is optically connected to the waveguide, and
wherein the optical modulation element is located between the laser diode and the waveguide and modulates an intensity of light reaching the waveguide.

8. The optical device according to claim 7,
wherein the at least one magnetic element comprises a plurality of magnetic elements,
wherein at least some of light propagating in the waveguide in a direction from the laser diode toward the waveguide is applied to a first magnetic element of the magnetic elements, and
wherein at least some of light output from the waveguide and reflected by an object to be irradiated is applied to a second magnetic element of the magnetic elements.

9. An optical system comprising: the optical device according to claim 7; and optics system that guides light output from the optical device to an object to be irradiated.

10. The optical device according to claim 1, further comprising a DC bias circuit that constitutes the another circuit, the DC bias circuit applying a bias voltage to electrodes arranged in the optical device, wherein the control circuit outputs the output signal to the DC bias circuit.

* * * * *